United States Patent
Ellis et al.

[15] 3,699,724
[45] Oct. 24, 1972

[54] A METHOD FOR SIMULTANEOUSLY MACHINING THE CENTER BORE OF A GEAR WORKPIECE AND THE END FACES PERPENDICULAR TO THE AXIS OF THE CENTER BORE

[72] Inventors: Myron P. Ellis, Royal Oak; Albin S. Czubak, Detroit; Keith A. McDonald, Union Lake, all of Mich.

[73] Assignee: Micromatic Hone Corporation, Detroit, Mich.

[22] Filed: Aug. 19, 1970

[21] Appl. No.: 65,160

Related U.S. Application Data

[62] Division of Ser. No. 701,447, Jan. 29, 1968, Pat. No. 3,525,178.

[52] U.S. Cl. .................................................51/287
[51] Int. Cl. .............................................B24b 1/00
[58] Field of Search.........51/281 R, 281 P, 287, 290, 51/323, 326, 3, 105 R

[56] References Cited
UNITED STATES PATENTS 2,924,910  2/1960  Klomp....................51/287 X
3,524,283  8/1970  Jones....................51/105 R X

*Primary Examiner*—Donald G. Kelly
*Attorney*—James H. Bower

[57] ABSTRACT

A multi-surface machining method for simultaneously machining the center bore of a gear workpiece concentric to the pitch circle of the gear teeth, and machining one or both of the end faces of the gear workpiece perpendicular to the axis of the center bore. The gear workpiece is rotated in a centerless manner by a pair of master gears comprising a driving gear and a braked retainer gear. The master gears improve the surface finish characteristics of the tooth flanks of the gear teeth while rotating the gear workpiece. Simultaneously, a first machining means is reciprocated axially in the gear workpiece center bore, and a second machining means is reciprocated over one or both of the end faces of the gear workpiece in a direction perpendicular to the axis of the center bore.

2 Claims, 35 Drawing Figures

INVENTORS
MYRON P. ELLIS
ALBIN S. CZUBAK
BY KEITH A. McDONALD

James H. Bower
ATTORNEY

3,699,724

Patented Oct 24 1972

INVENTORS
MYRON P. ELLIS
ALBIN S. CZUBAK
BY KEITH A. McDONALD

James H. Bower
ATTORNEY

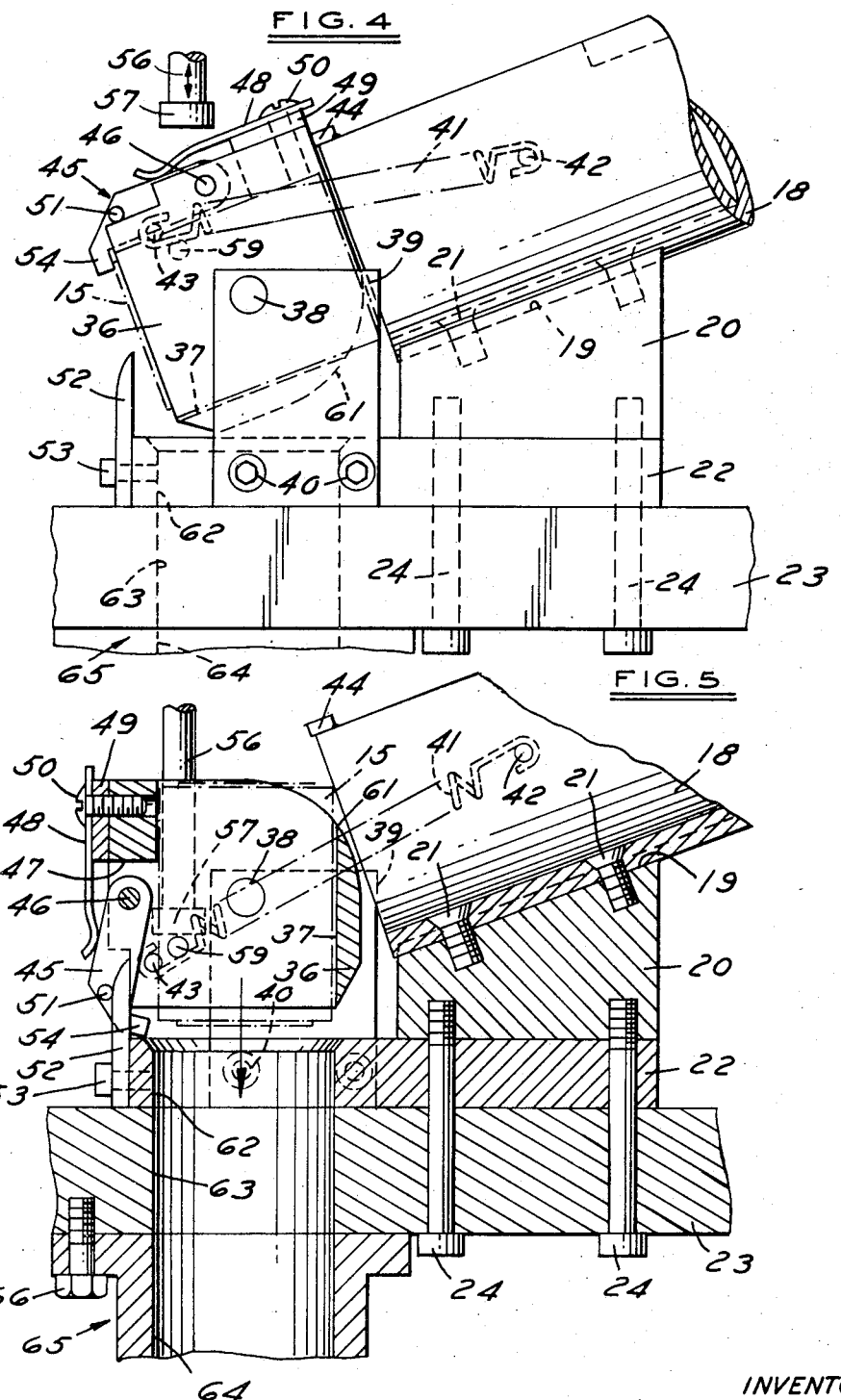

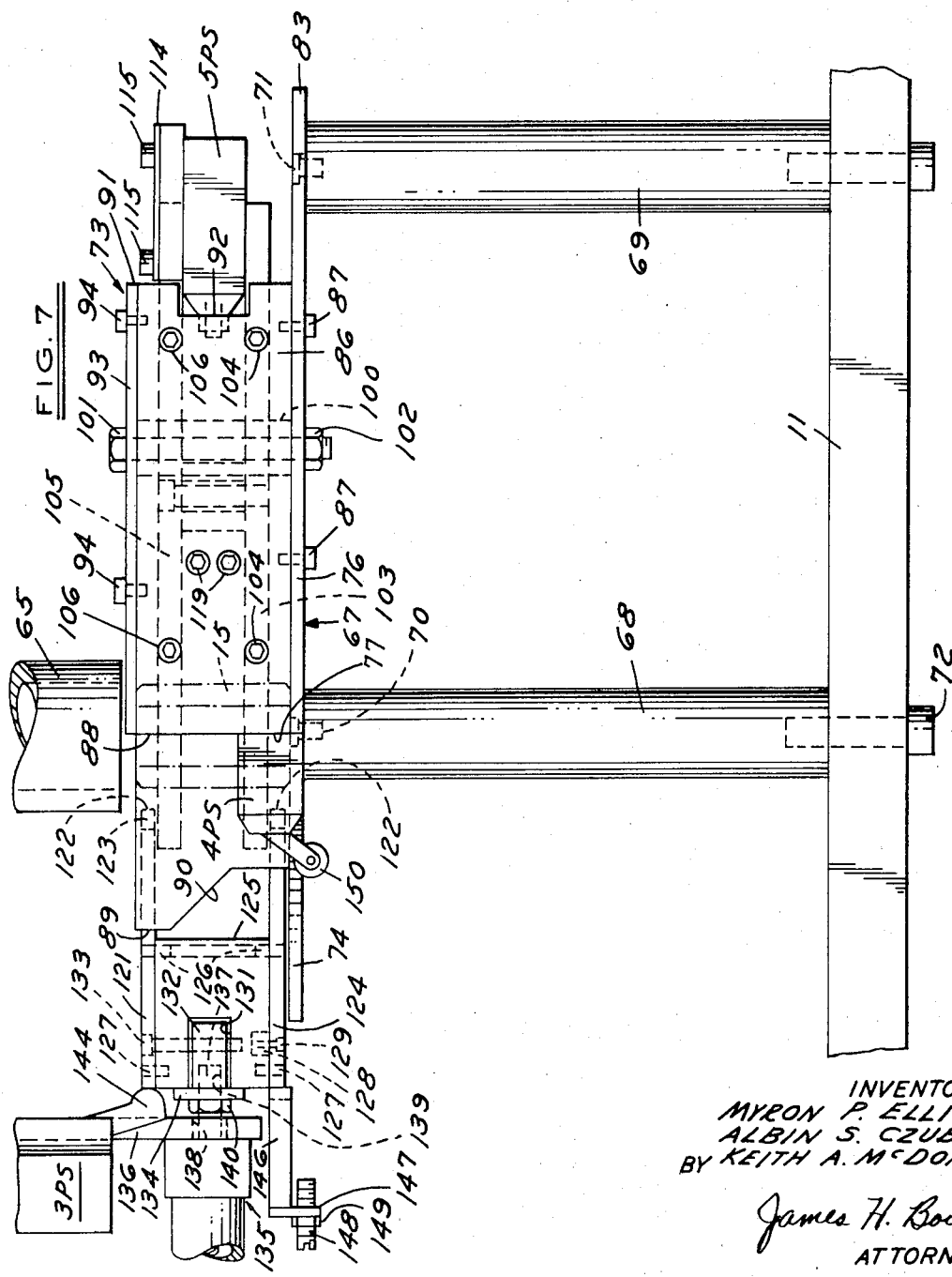

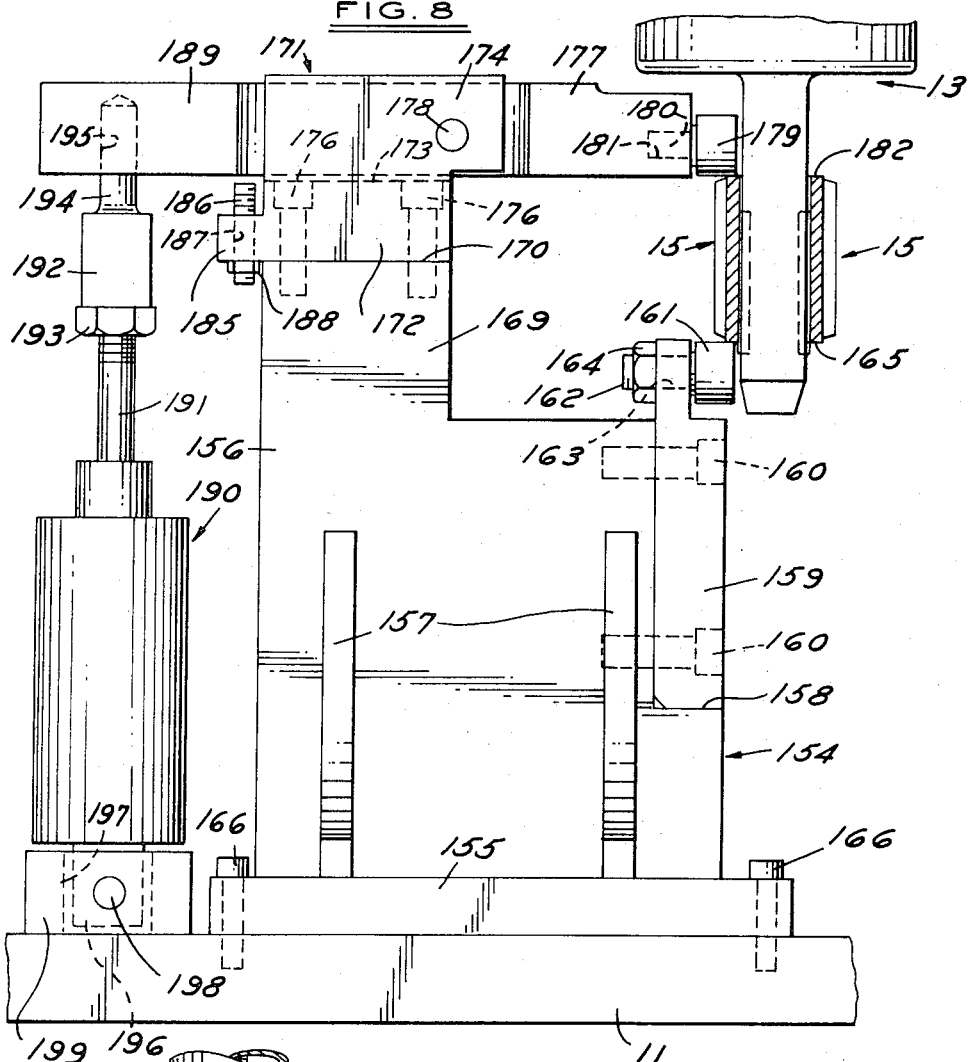
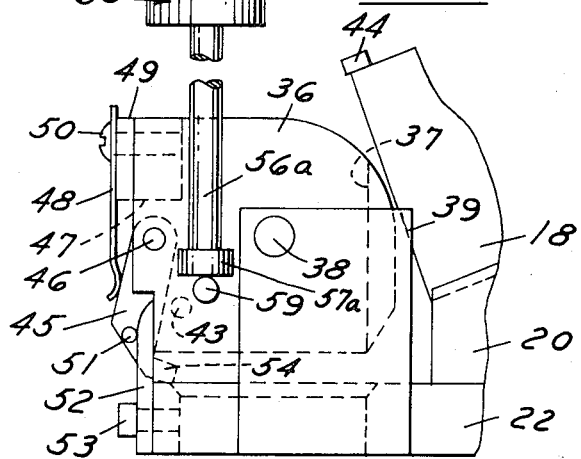

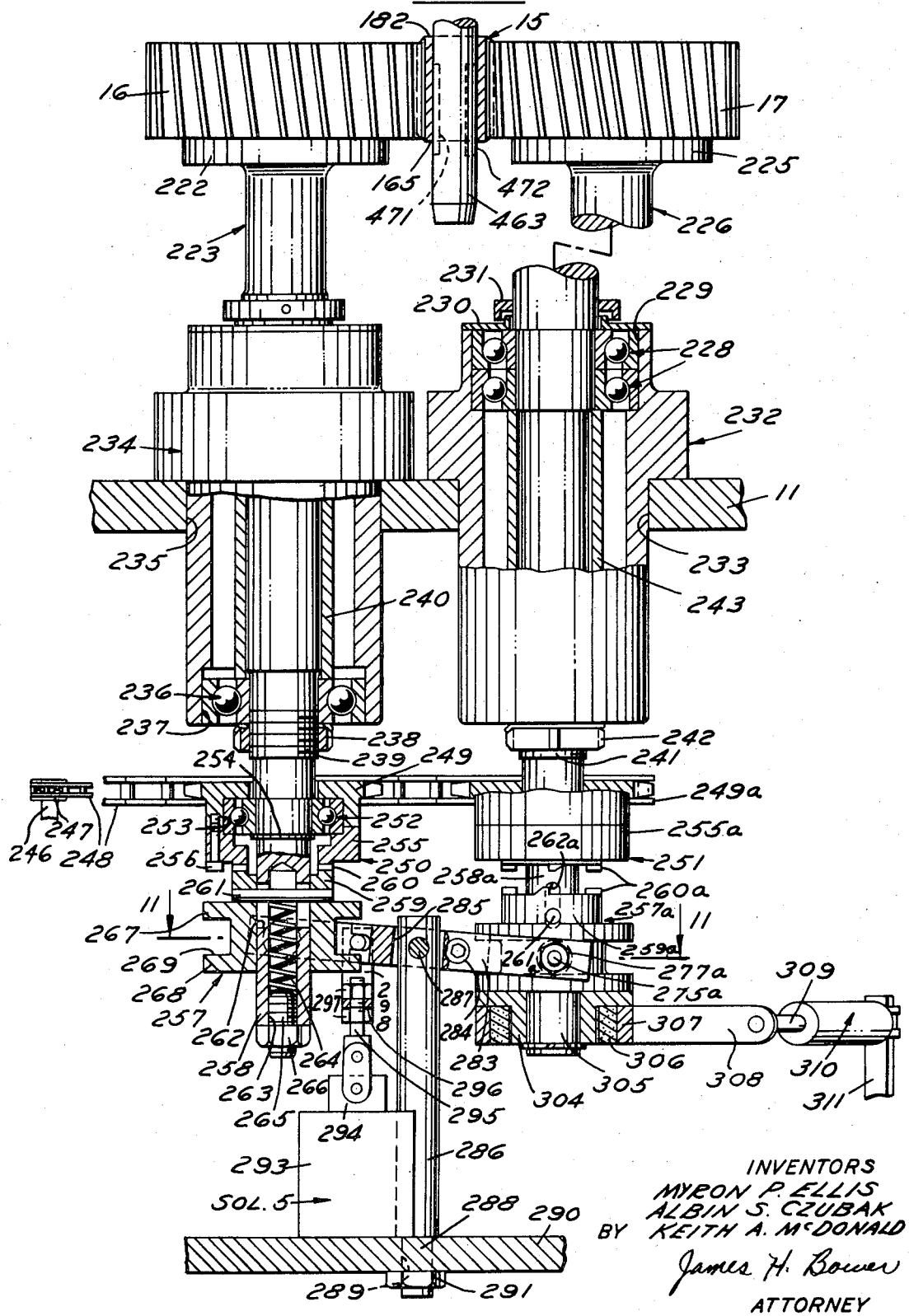

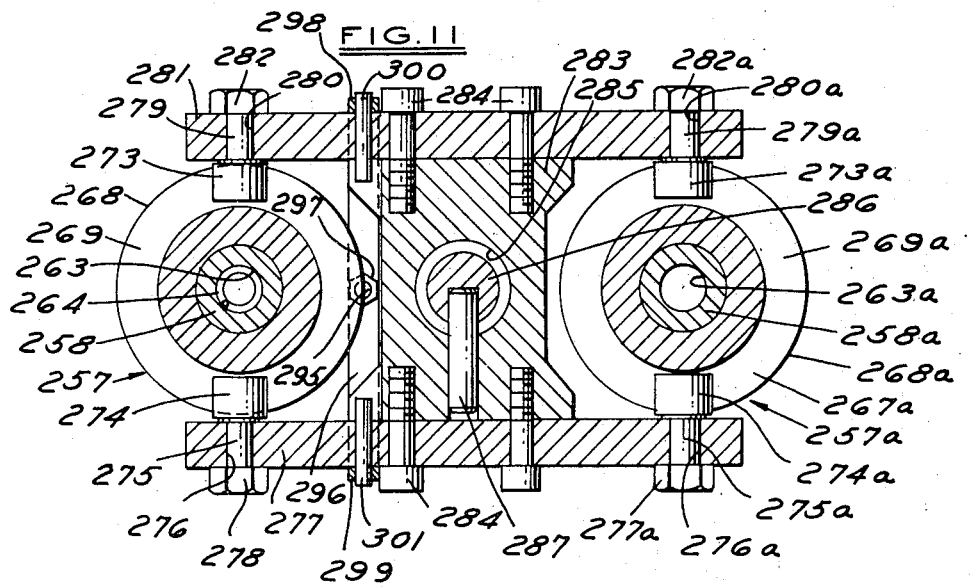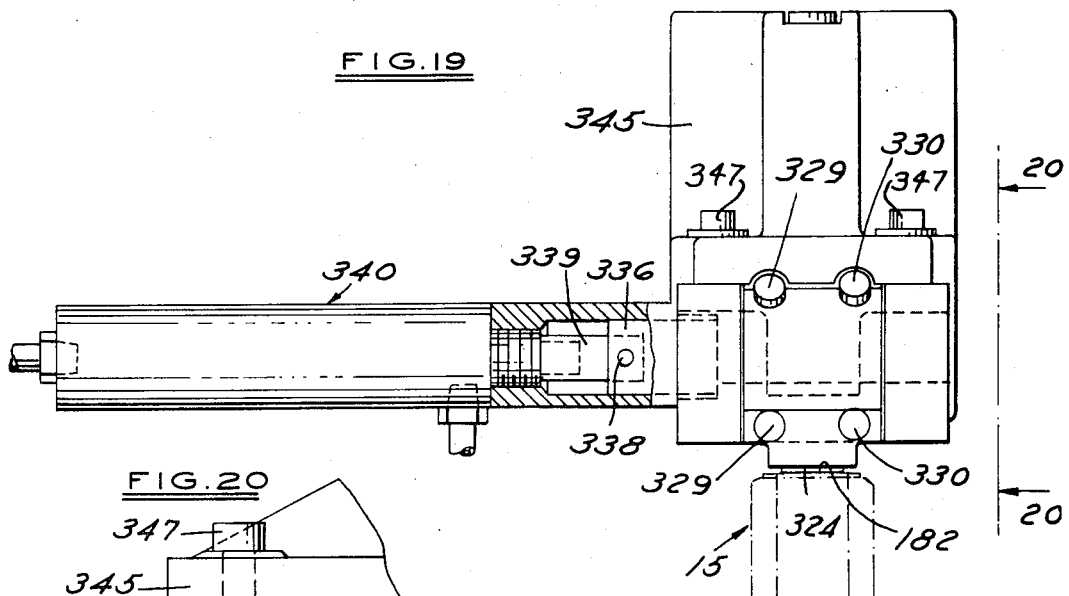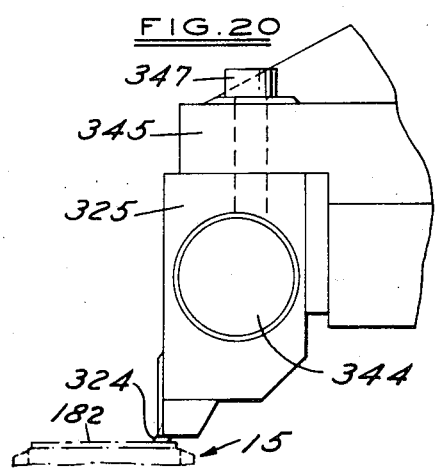

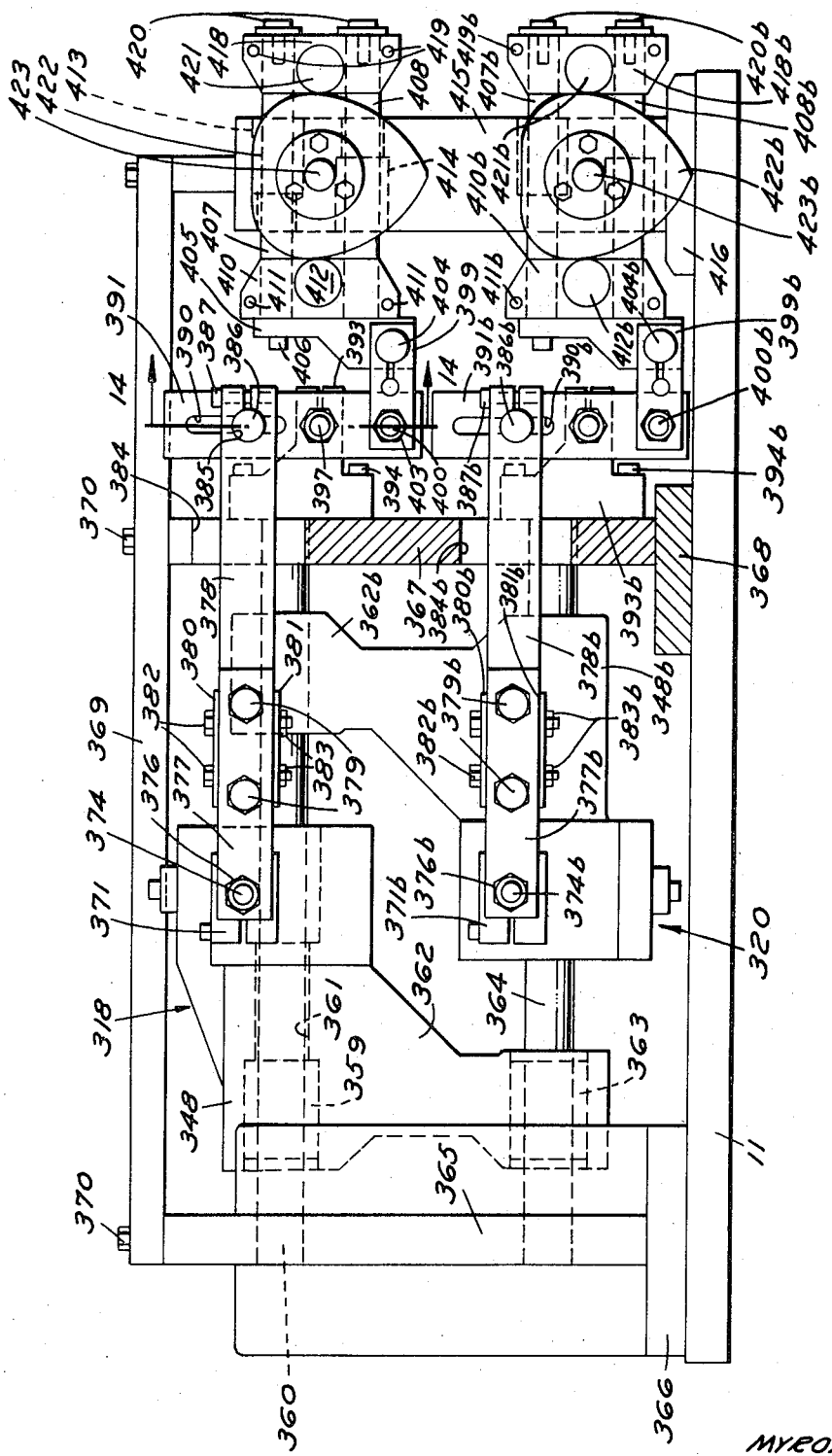

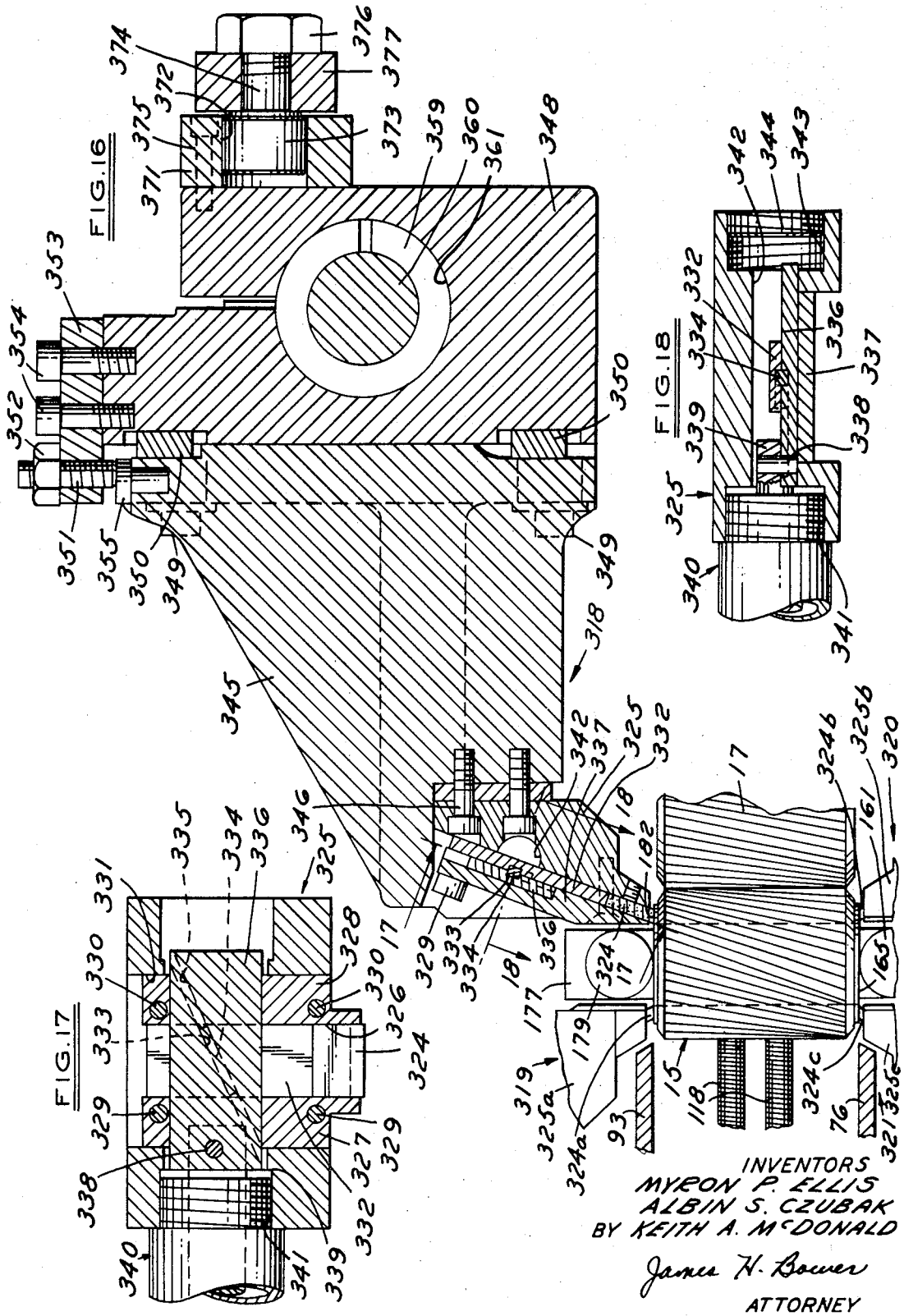

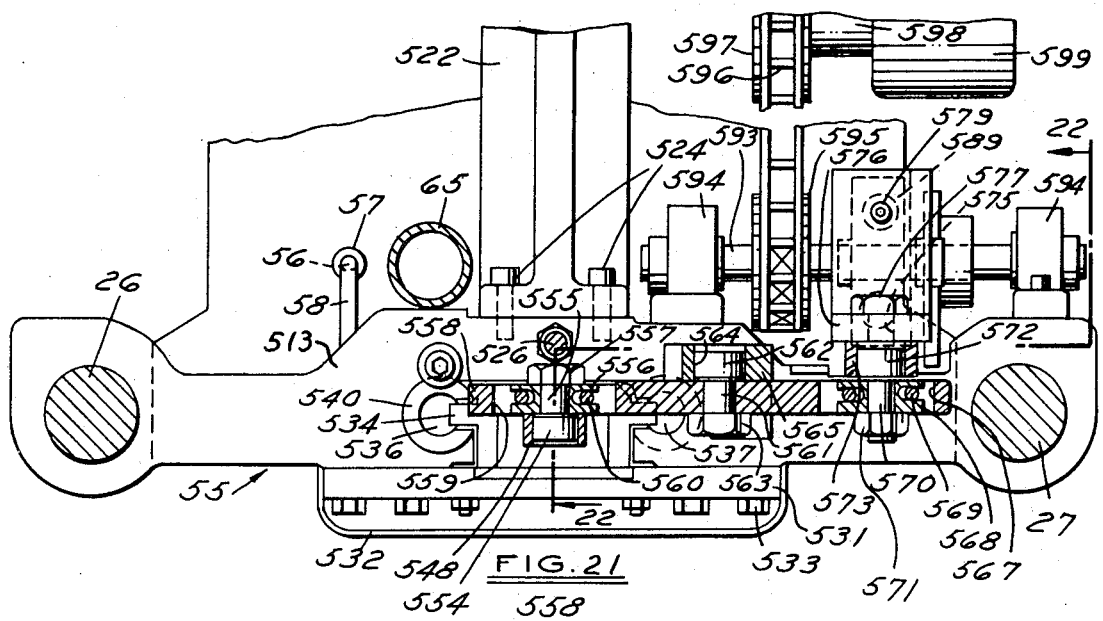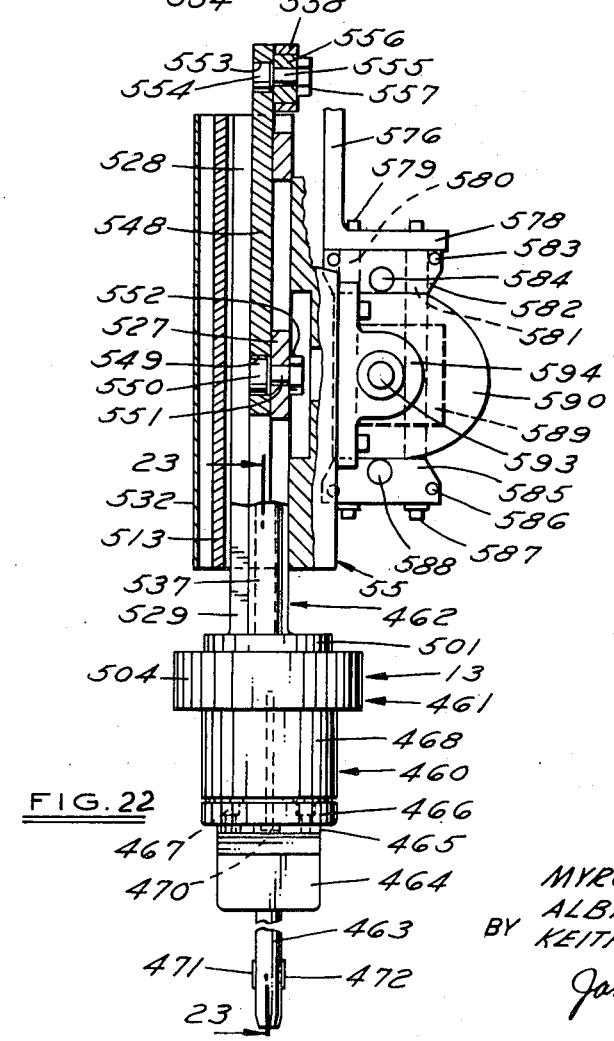

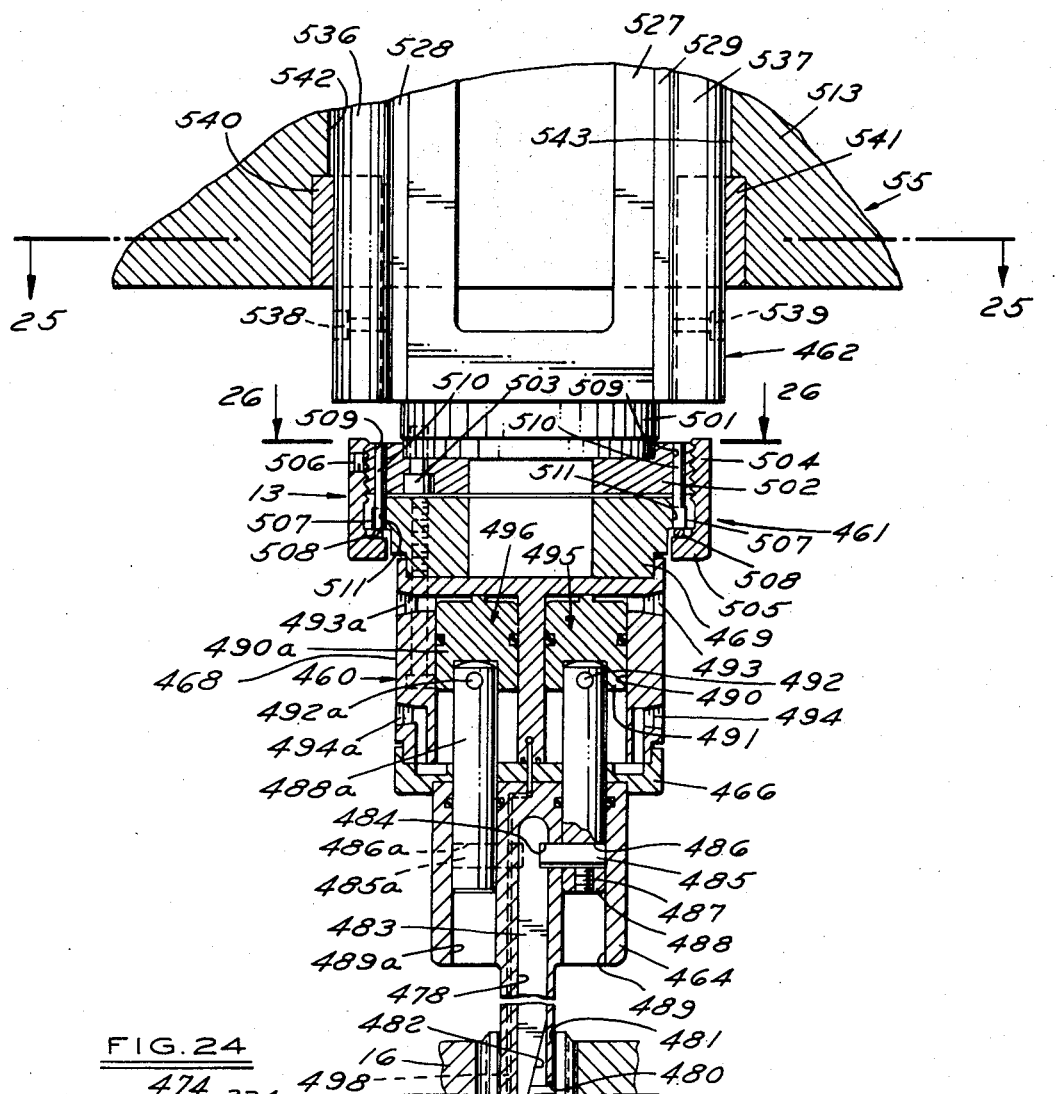
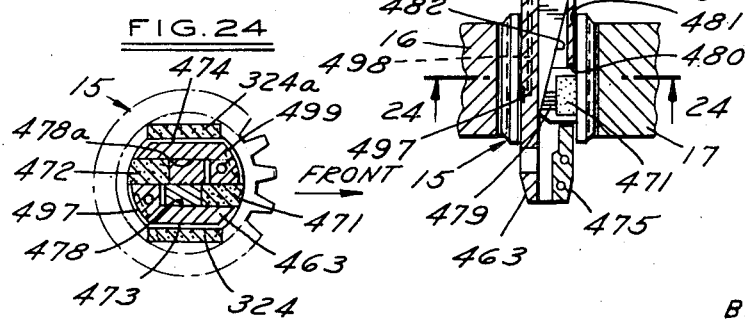

INVENTORS
MYRON P. ELLIS
ALBIN S. CZUBAK
BY KEITH A. McDONALD

James H. Bower
ATTORNEY

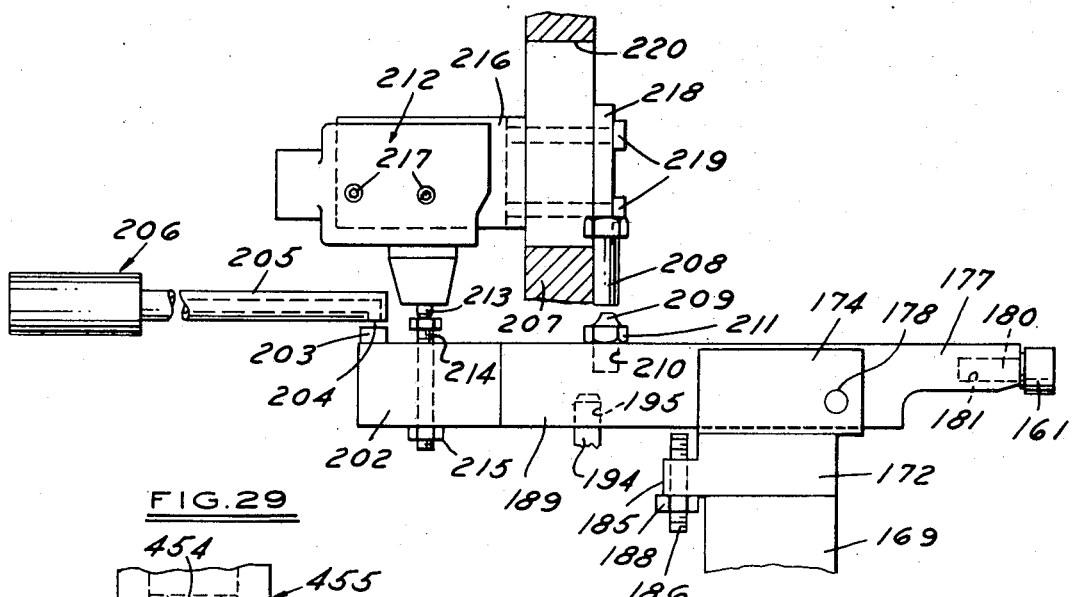
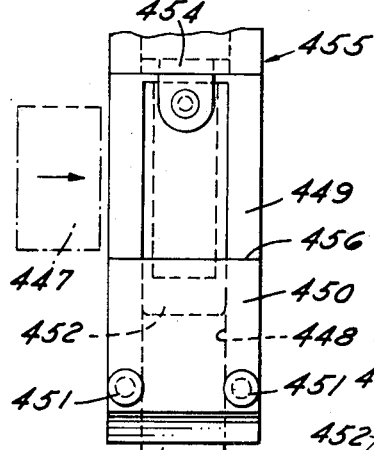
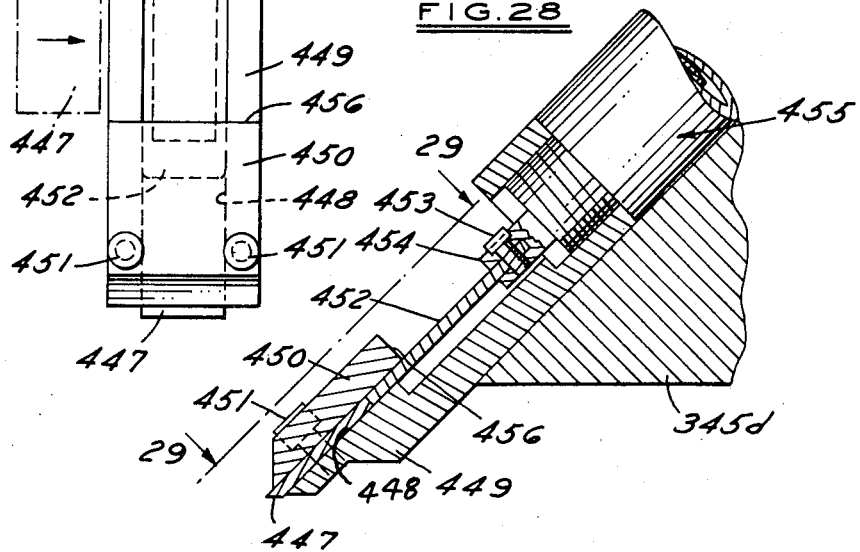

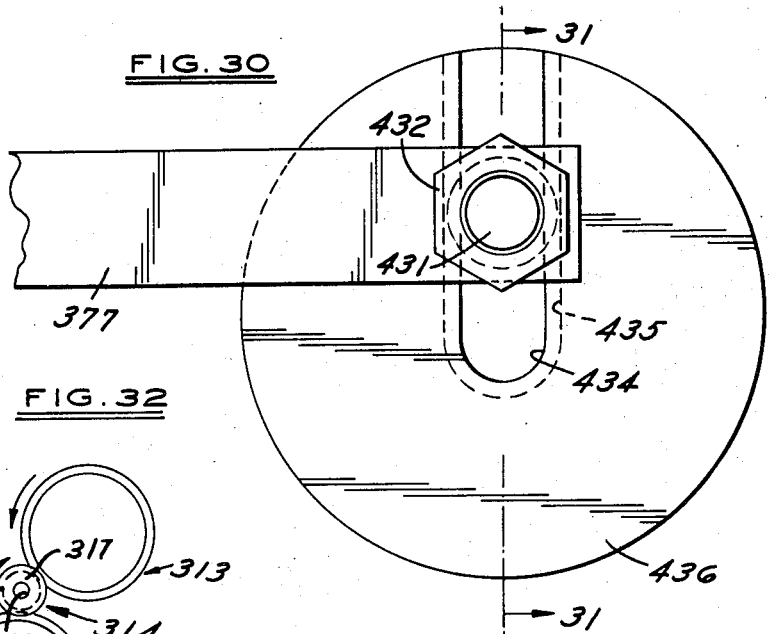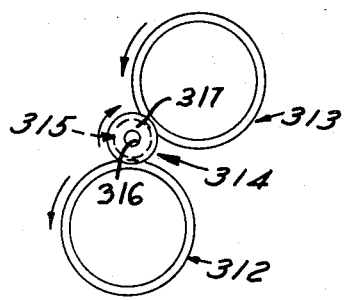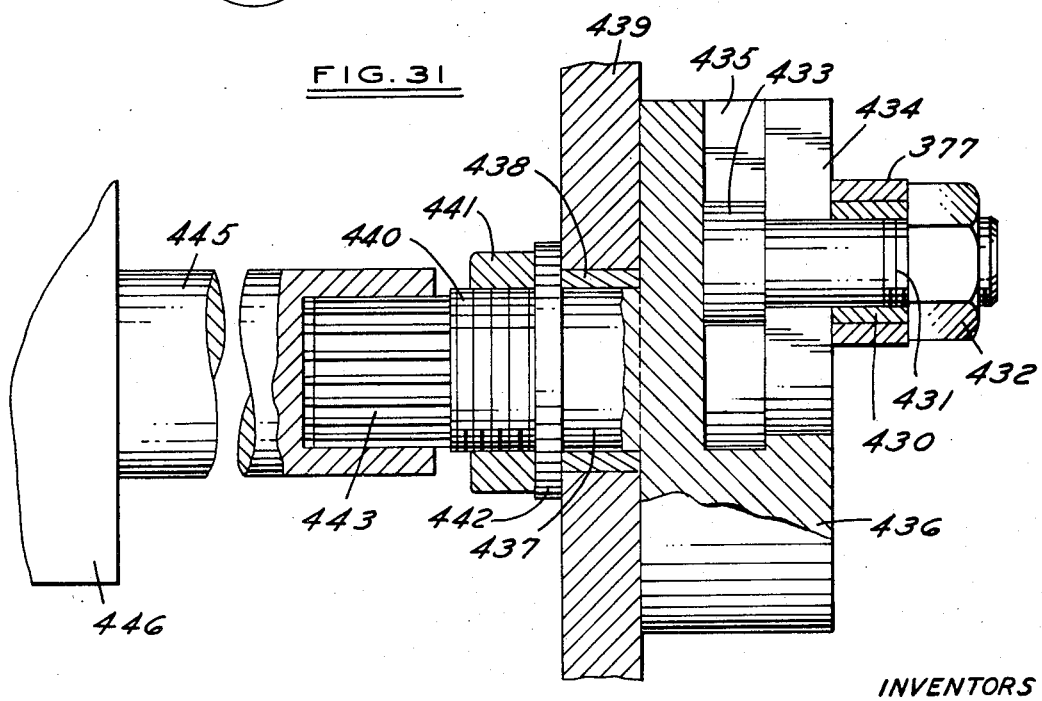

METHOD FOR SIMULTANEOUSLY MACHINING THE CENTER BORE OF A GEAR WORKPIECE AND THE END FACES PERPENDICULAR TO THE AXIS OF THE CENTER BORE

This application is a division of parent application Ser. No. 701,447, filed Jan. 29, 1968, now U.S. Pat. No. 3,525,178, issued Aug. 25, 1970.

SUMMARY OF THE INVENTION

This invention relates generally to the machining art, and more particularly, to a method for simultaneously machining the center bore of a rotatable workpiece concentric to a characteristic circle and machining one or both of the end faces of the workpiece perpendicular to the axis of the center bore.

The generating of functional surface finishes and correct geometrical relationships between the vital surfaces on rotatable parts such as gears, bearing races and the like, has always been a problem to the machining industry. It is very important to have correct geometric relationships between the vital surfaces of gears in automotive transmissions, gear pumps, and other types of gear applications. For example, a noisy transmission in an automobile is a common complaint today, and such condition is due in many instances to imperfections in the gear tooth surfaces, burrs and the like. However, the noise in many transmissions is due to the lack of concentricity between the center bore of a gear in the transmission and the pitch circle of the gear, as well as to the lack of squareness between the end faces of the gear and the center bore. As another example, the lack of end face squareness relative to the center bore of a gear in a gear pump will cause leakage and a failure to build up pressure in the pump. Heretofore, the machining industry has attempted to overcome the problem of providing correct functional relationships between the vital surfaces of gears and other rotatable parts by honing the center bores and the end faces with no control or relationship to the vital dimensions. However, it has been found that such prior art separate machining operations do not establish correct geometric relationships between the vital surfaces of a rotatable part.

In view of the foregoing, it is an important object of the present invention to provide a multi-surface machining method for simultaneously finishing the vital surfaces of rotatable parts in a single, fast and fully automatic machining process to overcome the aforementioned problems encountered with the prior art machines and methods for machining the vital surfaces of rotatable parts.

The machine described herein as an illustrative embodiment of the invention is a gear honing machine for producing accurate, quiet running, and efficient gears through the improved machining techniques of the present invention. However, it will be understood, that the principles of the present invention may also be employed in machines for machining other types of rotatable parts. The illustrated honing machine is provided with a workhead for handling rotating parts which includes a pair of mating master gears for rotating and locating at a work station a rotatable workpiece, as a gear workpiece, in a centerless manner about a first axis coaxial with the center of a characteristic circle on the workpiece, as for example, a pitch circle on a gear workpiece.

The workhead further includes a workpiece storage chute, an automatic pneumatically operated loading mechanism which indexes the rotatable workpieces into position between the two master gears and means for unloading the workpieces. The mating master gears improve the surface finish characteristics of the tooth blanks of the gear teeth while rotating a gear workpiece. The master gears contact a gear workpiece on the pitch circle and rotate the gear workpiece with the center bore in a vertical position. The gear workpiece is positioned endwise between two rollers or shoes to take end thrust and still allow the gear workpiece to rotate. The gear workpiece is driven about a reciprocating, nonrotating vertical abrading means to generate the center bore concentric with the pitch circle of the gear workpiece. This vertical abrading means is provided with automatic sizing means to size the center bore and terminate the machining cycle for both the center bore and end facing operations. Simultaneously with the vertical abrading operation, a second abrading means is adapted to reciprocate on a second axis perpendicular to the axis of the center bore to machine at least one of the end faces of the gear workpiece perpendicular to the axis of the center bore. The combined abrading operations act on the gear workpiece in a manner to generate bore to end face squareness, and end face parallelism while improving total gear runout. After the machining cycle is terminated, the machined gear workpiece is ejected and another gear workpiece is indexed into position to start the next cycle.

It is another object of the present invention to describe a multi-surface machining method which is capable of finish machining a plurality of vital surfaces on a rotatable workpiece under conditions of controlled abrading member length of stroke, and controlled combinations of abrading member motions, speeds and pressures, so as to generate accurate geometric relationships between the said vital surfaces with the desired surface finishes and lay pattern characteristics.

It is another object of the present invention to describe a method for simultaneously performing machining operations on the center bore and end faces of a rotatable workpiece having a center bore, a pair of end faces perpendicular to said center bore, and a characteristic circle concentric with said center bore, comprising: a workhead for handling rotating parts including, means for rotating and locating a rotatable workpiece in a centerless manner about a first axis coaxial with the center of said circle at a work station, means for loading a rotatable workpiece into said means for rotating and locating a rotatable workpiece at said work station, and, means for unloading a rotatable workpiece from said means for rotating and locating a rotatable workpiece; a first machining means operatively mounted for reciprocating movement along said first axis to machine the center bore of the rotatable workpiece concentric to said first axis; and, a second machining means operatively mounted for reciprocating movement on a second axis perpendicular to said first axis to machine at least one of the end faces of said rotatable workpiece perpendicular to said first axis.

It is still another object of the present invention to describe a method for handling rotatable workpieces which provides quick loading and unloading of the workpieces into a work station, and which comprises two wheels and a workpiece loader unit, and wherein one of the wheels is driven by a motor and the other wheel is provided with a braking system to resist the rotation imparted to the workpiece held between the wheels, whereby the combination of driving and braking motions by the two wheels tend to drive the workpiece between the wheels in a centerless manner while the workpiece is being operated on by machining means. The peripheral form of the wheels depends on the type of rotatable workpiece being machined, for example, for a gear workpiece the drive wheels would be provided with teeth to mesh with the teeth on the gear workpiece.

It is a further object of the present invention to describe a method for simultaneously performing machining operations on the center bore and end faces of a rotatable workpiece, as a gear workpiece, having a center bore, a pair of end faces perpendicular to said center bore, and a characteristic circle, as a pitch circle, concentric with said center bore, comprising: a work head for handling rotatable workpieces as gear workpieces including, a pair of mating wheels for rotating and locating a rotatable workpiece in a centerless manner about a first axis coaxial with the center of said characteristic circle at a work station, means for loading a rotatable workpiece between said wheels, and means for unloading a rotatable workpiece from said work station; a first abrading means operatively mounted for reciprocating movement along said first axis to machine the center bore of the rotatable workpiece concentric to said first axis; and, a second abrading means operatively mounted for reciprocating movement along a second axis perpendicular to said first axis to machine at least one of the end faces of said rotatable workpiece perpendicular to said first axis. The first abrading means may include a floating adaptor means to allow the abrading means to float along an axis perpendicular to the center line connecting the center axes of the wheels.

It is still a further object of the present invention to provide a method of simultaneously generating center bore to characteristic circle concentricity and end face to center bore squareness on a rotatable workpiece having a center bore, a pair of end faces perpendicular to said center bore, and a characteristic circle comprising, the simultaneous operations of: rotating the rotatable workpiece in a centerless manner about an axis coaxial with the center of the center bore, between a rotating drive member and a braked member engaging the rotatable workpiece at said characteristic circle; machining at least one of the end faces of the rotatable workpiece perpendicular to said axis; and, machining the center bore of the rotatable workpiece concentric to said characteristic circle.

It is still another object of the present invention to provide a method of generating a final surface finish on the tooth flanks of the gear teeth on a gear workpiece having a center bore, and simultaneously generating center bore to pitch circle concentricity and end face to center bore squareness, comprising, the simultaneous operations of: rotating the gear workpiece in a centerless manner about an axis coaxial with the center of the center bore, between a pair of machining gears to machine the tooth flanks of the gear teeth on the gear workpiece; machining at least one of the end faces of the gear workpiece perpendicular to said axis; and, machining the center bore of the gear workpiece concentric to said axis.

Other features and advantages of this invention will be apparent from the following detailed description, appended claims, and the accompanying drawings.

In the drawings:

FIG. 4 is a fragmentary, enlarged side elevational view of a portion of the rotatable workpiece loading structure, taken in the direction of the arrow marked 4 in FIG. 1, and looking from the inside of the machine in a direction horizontally outward;

FIG. 5 is a vertical section view of the structure shown in FIG. 4, and with the rotatable workpiece control block shown pivoted to a discharge position;

FIG. 7 is a fragmentary, side elevational section view, partly in section, of the structure illustrated in FIG. 6, taken along the line 7—7 thereof, and looking in the direction of the arrows;

FIG. 8 is a fragmentary, elevational section view, with parts removed, of the structure illustrated in FIG. 6, taken substantially along the line 8—8 thereof, looking in the direction of the arrows, and showing the gear workpiece in section;

FIG. 9 is a view similar to that of FIG. 4, and showing a slight modification of the loading structure wherein the rotatable workpiece control block is pivoted by a pneumatic cylinder;

FIG. 10 is a fragmentary, elevational view, partly in section, of the structure illustrated in FIG. 6, taken along the line 10—10 thereof, and looking in the direction of the arrows;

FIG. 11 is a fragmentary, slightly enlarged, horizontal sectional view of the structure illustrated in FIG. 10, taken along the line 11—11 thereof, and looking in the direction of the arrows;

FIG. 13 is a right-side elevational view, with parts in section, of the structure illustrated in FIG. 12, taken along the line 13—13 thereof, and looking in the direction of the arrows;

FIG. 16 is a fragmentary, enlarged, elevational section view of the structure illustrated in FIG. 12, taken along the line 16—16 thereof, and looking in the direction of the arrows;

FIG. 17 is a fragmentary, elevational section view of the structure illustrated in FIG. 16, taken along the line 17—17 thereof, and looking in the direction of the arrows;

FIG. 18 is a fragmentary, sectional view of the structure illustrated in FIG. 16, taken along the line 18—18 thereof, and looking in the direction of the arrows;

FIG. 19 is a fragmentary, enlarged, elevational view, partly in section, of the structure illustrated in FIG. 12, taken along the line 19—19 thereof, and looking in the direction of the arrows;

FIG. 20 is a fragmentary, elevational view of the structure illustrated in FIG. 19, taken along the line 20—20 thereof, and looking in the direction of the arrows;

FIG. 21 is a fragmentary, enlarged, horizontal sectional view of the structure illustrated in FIG. 1, taken along the line 21—21 thereof, and looking in the direction of the arrows;

FIG. 22 is a fragmentary, elevational section view of the structure illustrated in FIG. 21, taken along the line 22—22 thereof, and looking in the direction of the arrows;

FIG. 23 is a fragmentary, enlarged, elevational section view of the structure illustrated in FIG. 22, taken along the line 23—23 thereof, and looking in the direction of the arrows;

FIG. 24 is an enlarged, horizontal section view of the abrading tools illustrated in FIG. 23, taken along the line 24—24 thereof, and looking in the direction of the arrows;

FIG. 27 is a view similar to FIG. 8 with parts removed, and showing a modified workpiece clamp roller provided with a safety part-present switch and control sizing unit;

FIG. 28 is a fragmentary, elevational, section view of a modified facing tool holder;

FIG. 29 is a fragmentary, top view of the structure illustrated in FIG. 28, taken along the line 29—29 thereof, and looking in the direction of the arrows;

FIG. 30 is a fragmentary view of a modified drive means for reciprocating the end facing tools;

FIG. 31 is an elevational view of the structure shown in FIG. 30, taken along the line 31—31 thereof, and looking in the direction of the arrows;

FIG. 32 is a plan view of a modified pair of drive wheels for driving a non-gear type of rotatable part in accordance with the principles of the invention;

GENERAL DESCRIPTION

The method of the present invention is adapted to perform machining operations on rotatable workpieces, and the particular type of machining operation to be used would depend upon the set-up of the machine. For example, the machine may be set-up to perform honing, grinding, lapping, or other machining operations on rotatable workpieces. The present invention is particularly useful in simultaneously machining the center bore and end faces of a rotatable workpiece, and to machine the center bore concentric to a characteristic circle on the rotatable workpiece, as for example, the pitch circle of a gear workpiece. The machine of the present invention is also adapted to improve the surface finish characteristics of the tooth flanks of the gear teeth on a gear workpiece simultaneously with the aforementioned boring and facing operations. Although the present invention is disclosed hereinafter in connection with the method of machining of gear workpieces, it will be understood that the invention is also applicable to the method of machining of other types of rotatable workpieces, as for example, the inner ring or race of a radial ball bearing.

Figure 1:
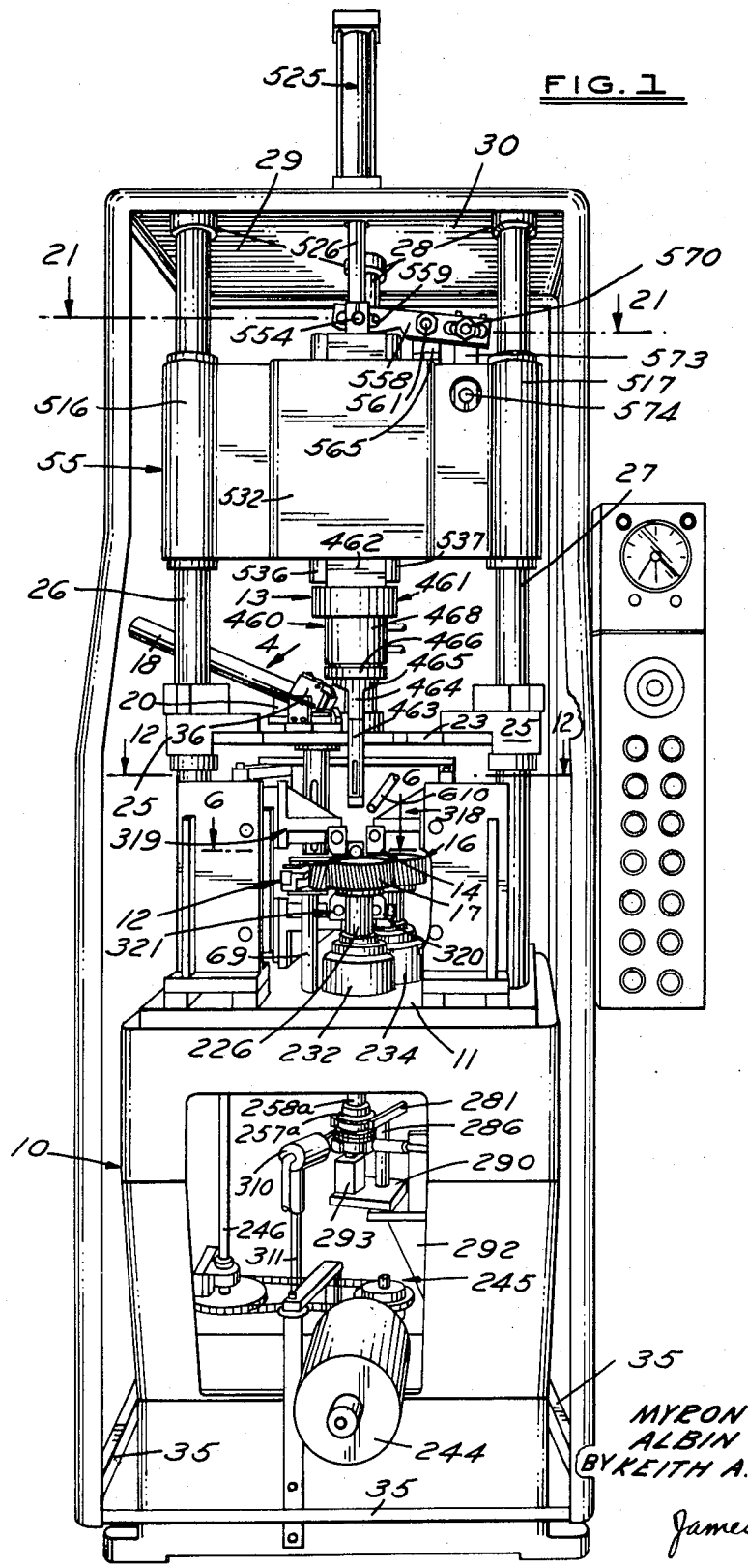
FIG. 1 is a front elevational view, with parts removed, of a honing machine made in accordance with the principles of the present invention.
Figure 2:
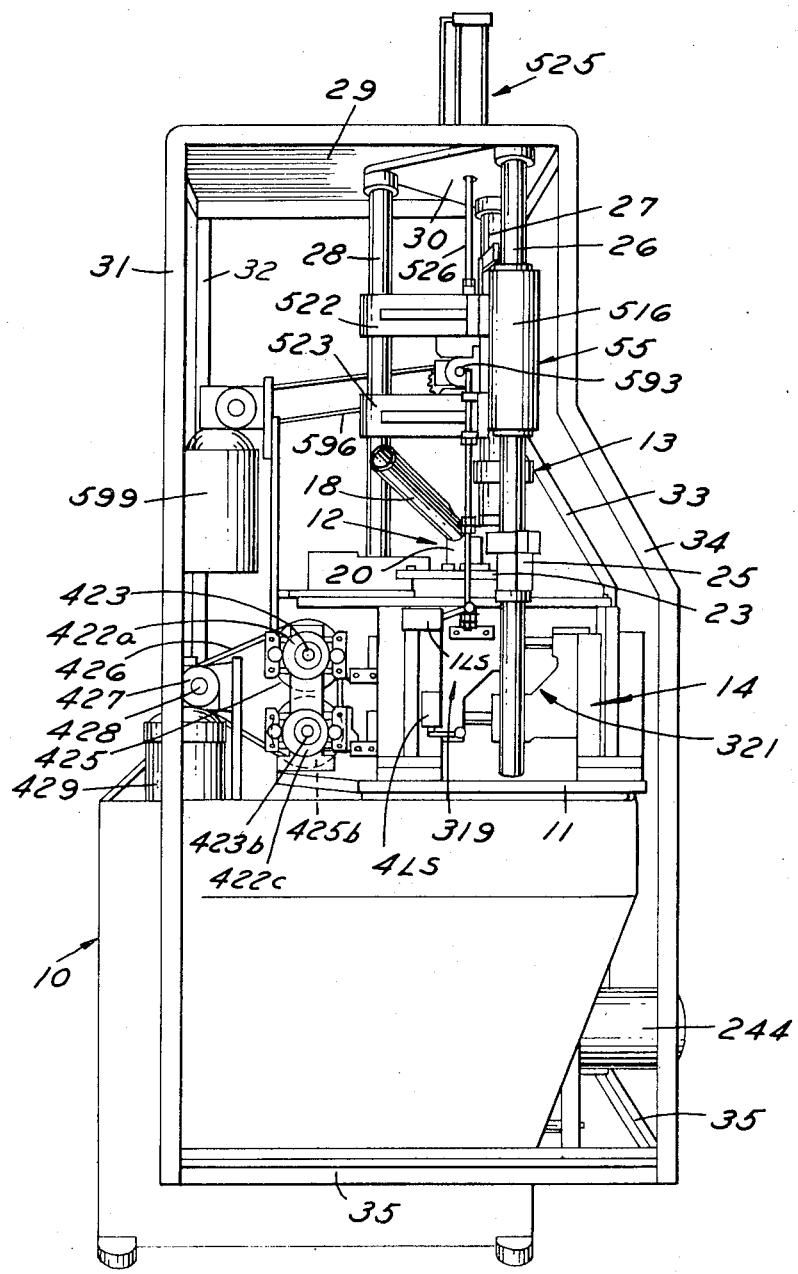
FIG. 2 is a slightly reduced, left side elevation view of the honing machine illustrated in FIG. 1.

Referring now to the drawings, and in particular to FIGS. 1 and 2, it will be seen that the machine employed for illustrating the principles of the present invention is a gear honing machine which includes a substantially square, floor-supported base housing, generally indicated by the numeral 10. The base housing 10 is provided with a base plate 11 on the top end thereof. A workhead for handling rotatable workpieces, generally indicated by the numeral 12, is operatively mounted on the base plate 11. The workhead 12 is adapted to store, load, rotate and unload rotatable workpieces, as described in detail hereinafter. The illustrative machine is provided with a nonrotating first machining means generally indicated by the numeral 13 which is constructed and arranged to reciprocate along a vertical axis. The numeral 14 generally indicates a second machining means which is constructed and arranged to reciprocate along a second axis perpendicular to the aforementioned vertical axis.

Figure 3:
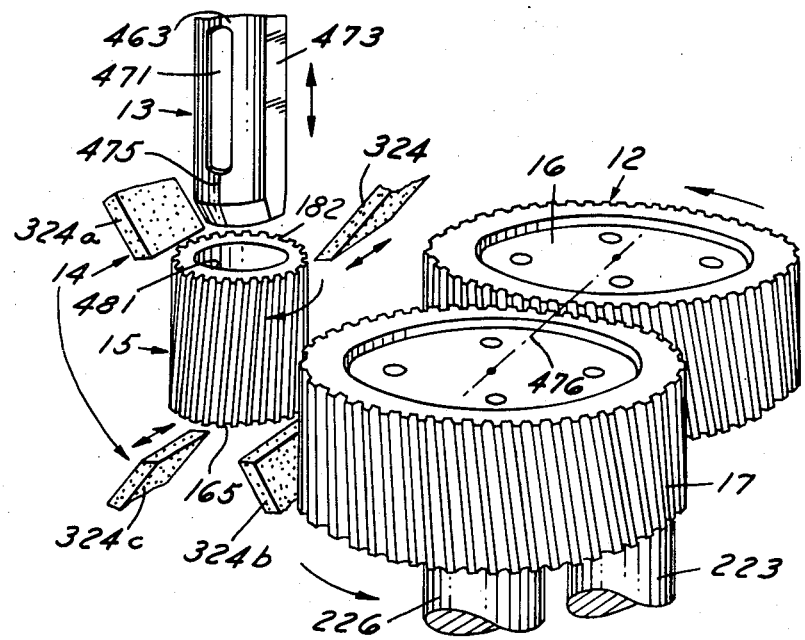
FIG. 3 is a fragmentary, exploded, schematic perspective view of a gear workpiece being operated on by a plurality of honing tools in accordance with the principles of the present invention, illustrating the simultaneous machining of the center bore and end faces of the gear workpiece while it is rotated in a centerless manner by two machining gears.

As illustrated in FIG. 3, the first machining means comprises a honing tool which is adapted to machine the center bore of an illustrative gear workpiece 15 while it is rotated in a centerless manner about a first axis coaxial with the center of the pitch circle or characteristic circle of the gear workpiece 15. The second machining means 14 comprises a plurality of honing tools which are adapted to machine at least one of the end faces of the gear workpiece 15 on a plane perpendicular to said first axis, so as to machine the end faces of the gear workpiece perpendicular to the center bore of the workpiece. The gear workpiece 15 is rotated in said centerless manner by a drive wheel 16 and a restricted or braked wheel 17 which form a part of the workhead 12. The wheels 16 and 17 are shown in the illustrative embodiment of FIG. 3 as a driving machining gear and a braked retainer machining gear, respectively.

The aforedescribed general structure of the illustrative honing machine of the present invention is described in detail hereinafter, and the advantages provided by the invention and the problems solved will be readily observed from the following detailed description of the structure and operation of the illustrative honing machine.

WORKHEAD

As shown in FIGS. 1, 2, 4 and 5, the workhead 12 includes a part or workpiece storage chute 18 which has a cross sectional shape formed in accordance with the shape of the workpiece to be handled. In the illustrative embodiment, the workpiece 15 is a pinion gear, and accordingly, the chute 18 is made in the form of a downwardly sloping, elongated tube with the upper end having the top portion removed so that the pinion gear workpieces 15 may be manually fed onto the chute 18, or be fed automatically by a suitable hopper. As shown in FIGS. 4 and 5, the lower end of the chute 18 rests on the concave, downwardly sloping upper end surface 19 of the support block 20 so as to provide the storage chute with a downward slope, so that the workpieces 15 will move downwardly through the chute 18 by gravity. The chute 18 is secured to the support block 20 by any suitable means, as by the screws 21. The support block 20 is seated on the top side of a chute mounting plate 22 which in turn is seated on a horizontal support plate 23. The two plates 22 and 23 are secured to each other and to the support block 20 by any suitable means, as by the socket head screws 24.

As shown in FIG. 1, the chute mounting plate 23 is fixed by any suitable means, at each side thereof, to a supporting bar clamp 25. The bar clamps 25 are fixed by any suitable means on a pair of laterally spaced apart vertical guide bars 26 and 27 in positions spaced upwardly from the base housing 10. The lower ends of the vertical guide bars 26 and 27 are fixed to the base plate 11 on the base housing 10. The machine is provided also with a center vertical guide bar 28 that is disposed rearwardly from the two guide bars 26 and 27 which are mounted along the front side of the base housing 10. The lower end of the center guide bar 28 is also fixed to the base plate 11 on the base housing 10.

As shown in FIG. 1, a cover plate 29 extends over the machine and it is supported on the upper ends of the three vertical guide bars 26, 27 and 28. As best seen in FIG. 2, the upper ends of the guide bars 26, 27 and 28 are also interconnected by a triangular support plate 30. Extending downwardly from the four corners of the top cover plate 29 are frame members 31, 32, 33 and 34 which are interconnected at the lower ends thereof by suitable angle irons as 35. The last mentioned frame structure is adapted to support suitable side covers for the machine, if desired. The last mentioned frame members are also fixed to the base housing 10 by any suitable means.

As shown in FIGS. 4 and 5, the storage chute 18 feeds the gear workpieces 15 into a rotatably mounted control block 36 which in turn feeds the gear workpieces 15 vertically downward to a pneumatically operated loader. The part control block 36 thus functions as a portion of the loading means of the workhead 12. The part control block 36 is provided with a bore 37 therethrough which has one end thereof disposed in alignment with the storage chute 18 when it is in the position shown in FIG. 4. The part control block 36 is rotatably mounted between a pair of side plates 39 by a pair of pivot pins 38. The two side plates 39 are secured to the chute mounting plate 22 by any suitable means as by the socket head screws 40. The part control block 36 is normally biased in a clockwise direction by a return coil spring 41, as viewed in FIG. 4, to a position to align the bore 37 with the chute 18. One end of the return spring 41 is secured to the chute 18 by an anchor pin 42 and the other end of the spring 41 is secured to the part control block 36 by an anchor pin 43. The chute 18 is provided with a fixed stop block 44 on the upper side thereof against which the part control block 36 abuts when it is rotated by the spring 41 to the position shown in FIG. 4.

The part control block 36 is provided with a pivotally mounted dog arm 45 to retain a gear workpiece 15 in the block 36 until it is rotated to feed the gear workpiece downwardly to the loader. The dog arm 45 is pivotally mounted at its upper end on a shaft 46 in the slot 47 formed on the front side of the block 36. The dog arm 45 is normally biased to a position against the block 36 by a leaf spring 48. The upper end of the spring 48 is secured by the screw 50 to the block 36. A shim 49 is disposed between the spring 48 and the block 36. The dog arm 45 is provided on its lower end with an integral, inwardly extended dog or portion 54 which engages the lower end face of the gear workpiece 15 in the block 36 and retains it therein until it is discharged downwardly.

The block 36 is rotated counterclockwise from the position shown in FIG. 4 to the position shown in FIG. 5 to discharge the gear workpiece 15 downwardly when the spindle support head or machine head 55 moves downwardly at the start of a work cycle. The block 36 may be rotated by any suitable means, as for example by the push rod 56 which has a push rod head 57 on its lower end. The push rod 56 is adapted to move downwardly and engage the actuating pin 59 and pivot the part control block 36 about the pivot pins 38 into the discharge or feed position shown in FIG. 5. During the rotational movement of the part control block 36, the vertical cam 52 engages the cam pin 51 on the dog arm 45 and swings the dog arm 45 outwardly to release the gear workpiece 15 and permit it to drop downwardly. Cam 52 is secured to the plate 22 by the screws 53. The upper end of the cam 52 is provided with a rounded-off portion so as to engage the cam pin 51 in a smooth camming action and swing the dog arm 45 in a counterclockwise direction, as viewed in FIG. 5, against the normal biasing action of the leaf spring 48. The push rod 56 may be fixed to the machine head 55 by any suitable means. As shown in FIG. 21, the push rod 56 is secured to the machine head 55 by a mounting arm 58. It will be understood that the push rod 56 may also be operated by other suitable control means. FIG. 9 illustrates the use of an air cylinder, generally indicated by the numeral 60, for actuating a push rod 56a. The numeral 57a indicates the push rod head which is adapted to engage the actuating pin 59 to rotate the part control block 36 in the same manner as described hereinabove for the structure of FIGS. 4 and 5.

As shown in FIG. 4, the upper corner or shoulder 61 on the lower side of the part control block 36 is rounded off so that when the part control block 36 is rotated to the discharge position of FIG. 5, the rounded shoulder 61 will engage and hold the next gear workpiece 15 in the chute 18. The part control block 36 thus functions to receive one gear workpiece 15 at a time and discharge the same upon actuation of the machine head 55 and simultaneously cut off the rest of the gear workpieces 15 on the chute 18 and hold them in place.

As shown in FIG. 5, the parts control block 36 discharges or feeds a gear workpiece 15 downwardly through the bores 62 and 63 in the plates 22 and 23, respectively, into the bore 64 in a vertically disposed workpiece load chute 65. The workpiece load chute 65 is secured to the lower side of the plate 23 by any suitable means, as by bolts 66. As shown in FIG. 7, the load chute 65 guides a gear workpiece 15 vertically downward and deposits it on a loader stationary base plate 67 of a pneumatically operated loader means 73 that indexes the gear workpiece 15 into position between the two gears 16 and 17, as more fully described hereinafter. The loader stationary base plate 67 is supported on two spaced apart posts 68 and 69, and it is secured thereon by any suitable means, as by the socket head screws 70 and 71. The posts 68 and 69 are supported on the base plate 11 of the base housing 10 and they are secured thereto by any suitable means, as by the screws 72.

Figure 6:
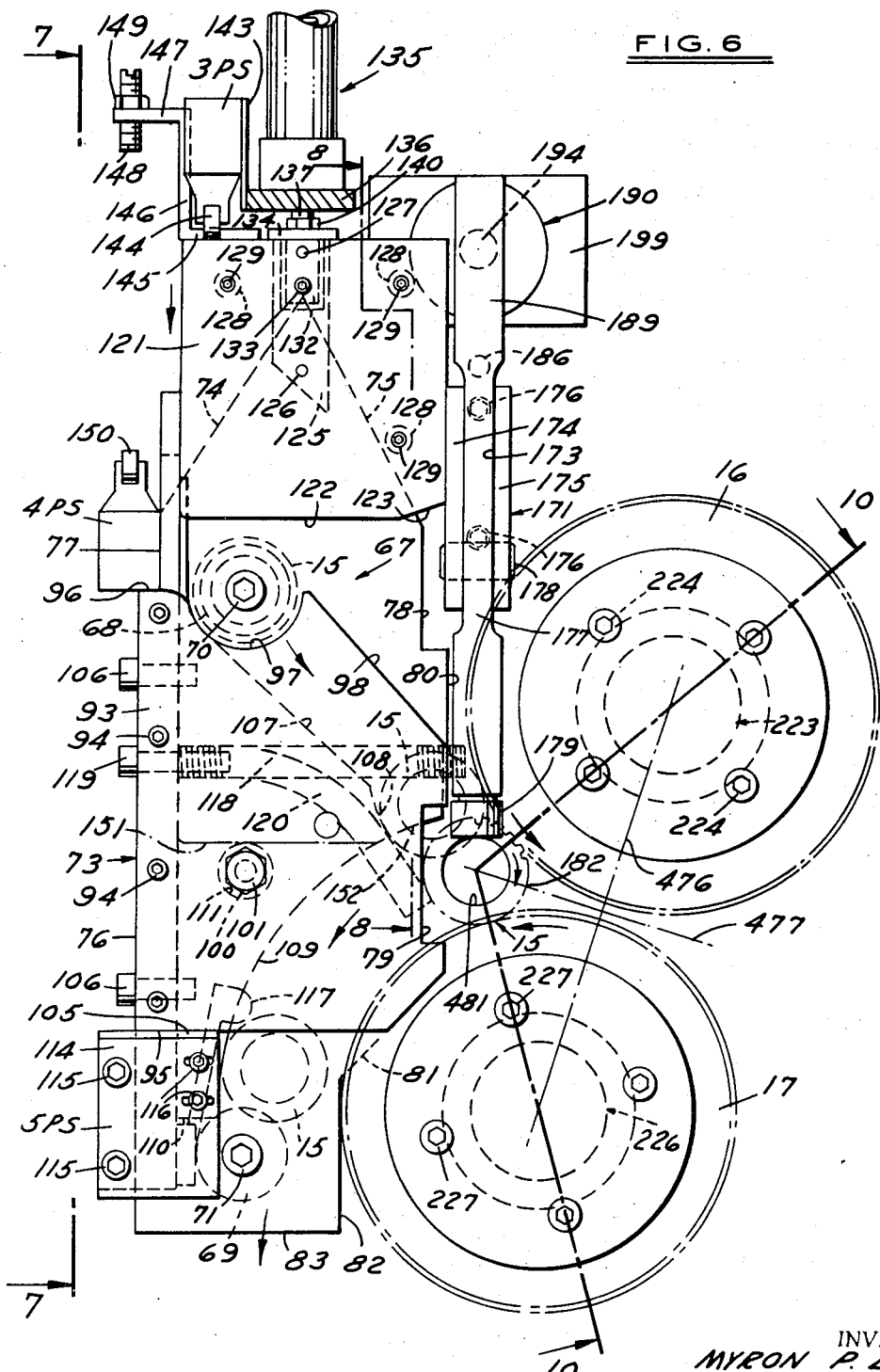
FIG. 6 is a fragmentary, enlarged, horizontal sectional view of the structure illustrated in FIG. 1, taken along the line 6—6 thereof, looking in the direction of the arrows and showing the rotary workpiece workhead structure.

The plan configuration of the loader stationary base plate 67 is shown in FIG. 6. The base plate 67 is disposed adjacent the two gears 16 and 17. As viewed in FIG. 6, the back end of the plate 67 is provided with the two converging side edges 74 and 75 which meet at a point, as seen in FIG. 6. The outer side edge of the plate 67 is substantially straight and is provided at the back end thereof with a cut-out or step 77 in which is seated a part-present switch 4PS. The switch 4PS is secured to the plate 67 by any suitable means, and the operation of this switch is explained hereinafter in the description of the operation of the machine. The inner side edge of the plate 67 is indicated by the numeral 80. The inner side edge 80 is provided with a pair of spaced apart cut-outs or steps 78 and 79. The inner forward corner of the plate 67 is disposed under the wheel 17 and it is cut out to provide the inwardly and forwardly sloping edge 81 which terminates in the longitudinally extended front straight inner edge portion 82. The front edge of the plate 67 is indicated by the numeral 83.

As shown in FIG. 7, the loader means 73 includes an outer side wall guide plate 86 which is secured on top of the stationary base plate 67 by any suitable means, as by a plurality of screws 87. The side wall guide plate 86 is provided along the back end with a cut-out or step, as indicated by the numeral 88, which is similar to the step 77 formed in the base plate 67 and in which is partially seated the part-present switch 4PS. The rear end of the side wall guide plate 86 is indicated by the numeral 89. The numeral 90 indicates an undercut or relief which is formed on the lower back corner of the side wall guide plate 86. The numeral 91 indicates the front end of the guide plate 86 and the numeral 92 indicates a recess formed in the front end of the guide plate 86.

As shown in FIGS. 6 and 7, the loader means 73 further includes a top horizontal guide plate 93 which is secured to the top edge of the side wall guide plate 86 by any suitable means, as by the screws 94. As best seen in FIG. 6, the front end of the top guide plate 93 is indicated by the numeral 95 and the back end of the top guide plate 93 is indicated by the numeral 96. A semicircular recess 97 is formed along the back end of the top guide plate 93 to permit the passage therethrough of a gear workpiece 15 as it is deposited on the stationary base plate 67. As viewed in FIG. 6, the top guide plate 93 has the rear right corner relieved or cut off along the outwardly and forwardly sloping line 98. The top guide plate 93 is also provided with a cut-out along the inner side thereof which is similar to the cut-out 79 on the lower or base plate 67.

As shown in FIGS. 6 and 7, a cylindrical spacer 100 is disposed between the base plate 67 and the top guide plate 93 and it is secured to these plates by the bolt 101 and the nut 102. As shown in FIG. 7, a lower horizontally disposed guide plate 103 is mounted between the base plate 67 and the top plate 93 in a position spaced upwardly from the plate 67. The guide plate 103 is secured to the side guide plate 86 by any suitable means, as by the socket head screws 104. An upper guide plate 105 is also horizontally disposed between the base plate 67 and the top guide plate 93 in a position spaced apart downwardly from the top guide plate 93 and in a position spaced upwardly from the lower guide plate 103. The upper guide plate 105 is secured to the side wall 86 by any suitable means, as by the socket head screws 106. As shown in FIG. 6, the plan configuration or shape of the upper guide plate 105 is indicated by the numerals 107, 108, 109 and 110. The numeral 107 shows that the rear edge of the upper guide plate 105 slopes forwardly and inwardly so as to guide a gear workpiece 15 sidewardly and forwardly into meshing position with the drive gear 16. The numeral 108 indicates that the upper guide plate 105 terminates in an inwardly and forwardly sloping edge which is formed at a slightly different angle than the plate edge portion 107. The guide plate edge 108 is disposed in a position spaced apart from the adjacent edge of the drive gear 16 and it extends in a direction substantially tangent to the gear 16. The edge 109 of the guide plate 105 shows that the forward portion of this guide plate is curved forwardly and outwardly, or to the left of the gears 16 and 17 as viewed in FIG. 6, so as to guide a finish machined gear workpiece 15 away from the work station between the gears 16 and 17 and to the discharge end or front end of the loader means 73. It will be understood that the lower guide plate 103 is formed along its inner edge in the same manner as the aforedescribed top guide plate 105.

As shown in FIGS. 6 and 7, a part-ejector switch 5PS is mounted on the front end of the loader means 73 in a position between the front ends of the guide plates 103 and 105. The part-ejector switch 5PS is held in an adjusted position adjacent the discharge end of the guide plate curved edges 109 by a mounting plate 114. The mounting plate 114 is secured to the outer edge portion of the switch 5PS by a pair of socket head screws 115. As shown in FIG. 6, the mounting plate 114 is adjustably secured to the front end of the upper guide plate 105 by a pair of socket head screws 116. The part ejector switch 5PS is provided with a spring biased contact member 117 which extends outwardly beyond the edges 109 of the guide plates 103 and 105 so as to be engaged by a finish machined gear workpiece 15 as it is moved forwardly and outwardly along the curved guide plate edges 109.

As shown in FIG. 6, a resilient cantilever means is disposed across the loading means 73 for use in indexing a gear workpiece 15 into meshing engagement with the retainer braked gear 17 for further movement into the work load position shown in FIG. 6 between the gears 16 and 17. In the illustrative structure the resilient cantilever means comprises a pair of coil springs 118 which are mounted in vertical aligned, spaced apart positions transverse to the base plate 67. The outer ends of the coil springs 118 are mounted on the inner ends of a pair of spaced apart, vertically aligned socket head screws 119, as shown in FIG. 7. The numeral 120 in FIG. 6 illustrates the broken line position of the springs 118 when they are flexed sidewardly and forwardly by the movement of the gear workpiece 15 being slid past the springs and into meshing engagement with the gears 16 and 17. It will be seen that the springs 118 apply a laterally directed load or force on a gear workpiece 15, and that they assist in loading a gear workpiece 15 into the work station between the gears 16 and 17, as more fully explained hereinafter.

The loader means 73 includes a pusher means which comprises a pair of pusher plates and a power means for moving these plates forwardly between the base plate 67 and the top guide plate 93 so as to push the gear workpieces 15 forwardly along the base plate 67 and past the springs 118 and into meshing engagement with the gears 16 and 17. As shown in FIG. 6, the gear workpiece pusher means includes the upper pusher plate 121 which is spaced upwardly from the base plate 67 and adapted to be slid forwardly and be guided along its outer edge by the outer guide wall plate 86. The numeral 122 in FIG. 6 indicates the front edge of the upper pusher plate 121. The numeral 123 in FIG. 6 indicates the cut-off or relieved right front corner of the upper pusher plate 121.

As shown in FIG. 7, the gear workpiece pusher means further includes a lower pusher plate 124 which has a plan configuration or shape identical to the upper pusher plate 121. As shown in FIGS. 6 and 7, the pusher plates 121 and 124 are spaced apart vertically by the spacer block 125 which has the outer front corner removed so that the front end of the spacer block 125 is formed substantially parallel to the rear angular guide edges 107 of the guide plates 103 and 105. As shown in FIG. 7, the guide plates 121 and 124 are secured to a spacer block 125 by the dowel pins 126 and 127. The pusher plates 121 and 124 are further fixed together and held apart by three cylindrical spacers 128 (FIG. 6) which are secured to the pusher plates by any suitable means as by the socket head screws 129.

As shown in FIGS. 6 and 7, the gear workpiece pusher plates 121 and 124 are adapted to be moved forwardly and backwardly by a suitable power operated means, as for example a pneumatic cylinder generally indicated by the numeral 135. The cylinder 135 is connected to the spacer block 125 by the following described structure. As best seen in FIG. 7, an inwardly extended bore 131 is formed in the back end of the spacer block 125 for the reception of a mounting adaptor indicated by the numeral 132. The mounting adaptor 132 is secured in the bore 131 by the socket head screw 133. The mounting adaptor 132 is provided with a flange 134 on the back end thereof which abuts the back end of the spacer block 125. The cylinder 135 is fixed on the vertical supporting bracket 136 which extends upwardly and is secured to a suitable supporting plate, as the supporting plate 23. As shown in FIG. 7, the cylinder rod 137 of the cylinder 135 extends through a suitable hole 138 in the support bracket 136 and into threaded engagement with an axial bore 139 formed in the outer end of the mounting adaptor 132. The cylinder rod 137 is locked in position in the bore 139 by the lock nut 140.

As shown in FIGS. 6 and 7, a back or stop switch 3PS is fixed in a position adjacent the air cylinder 135 so as to be operated by the pusher means when the pusher plate 121 is in the retracted or initial position shown in solid lines in FIG. 6. As shown in FIG. 6 switch 3PS is fixed on a mounting plate 143 which is secured to the vertical support bracket 136. The numeral 144 on switch 3PS indicates the switch contact operating arm which is engaged by the upper pusher plate 121 when it reaches the retracted position shown in FIG. 6.

A switch operating mechanism is mounted on the lower pressure plate 124, as shown in FIGS. 6 and 7, and it is adapted to operate the part-present switch 4PS when the workpiece pusher means is in the forward, broken-line position indicated by the numerals 151 and 152 in FIG. 6. As best seen in FIG. 6, the numerals 145, 146, and 147 designate three bracket arms which form a bracket mounting structure that is secured to the rear end of the lower pusher plate 124. The bracket arm 147 extends sideward outwardly and has threadably mounted therethrough a switch operating screw 148 which is adapted to be secured in an adjusted position by the nut 149. The numeral 150 on switch 4PS designates the switch contact operating arm for that switch which is adapted to be engaged by the screw 148 when the pusher plates 121 and 124 are moved forwardly to the broken-line position indicated by the numerals 151 and 152 in FIG. 6.

An overall description of the operation of the machine is set forth hereinafter. However, the following description sets forth the sequence of mechanical motions which take place during a typical automatic machining cycle. Assuming that a gear workpiece 15 has been deposited by the loader chute 65 on the base plate 67, the air cylinder 135 is energized so as to move or displace the loader or pusher plates 121 and 124 forwardly until they contact the gear workpiece 15 and transfer it along the angular loader guide edges 107 on the guide plates 103 and 105. The gear workpiece 15 is rolled along the angular guide edges 107 and displaced in a linear direction until it makes contact with the drive gear 16. The rolling motion of the gear workpiece 15 assures positive meshing engagement with the rotating drive gear 16. After the gear workpiece 15 is meshed with the drive gear 16, it is transferred by the drive gear 16 radially into the machining position or work station indicated by the solid line position of the gear workpiece 15 in FIG. 6. The workpiece 15 is prevented from becoming disengaged from the drive gear 16 by the curved loader plate edges 108, which are a continuation of the outer guide edges 107 on the guide plates 103 and 105. During the last approximate 15° are of radial travel, the gear workpiece 15 is retained in mesh with the drive gear 16 by the aforedescribed resilient cantilever guide means which is shown in the illustrative embodiment as comprising a pair of coil springs 118. The springs 118 provide a sideward thrust or load on the gear workpiece 15 so as to urge the workpiece toward the gears 16 and 17 until a point in the radial travel of the gear workpiece 15 is reached where it is in a position to mesh with the retainer braked gear 17. Once the gear workpiece 15 is in the machine or hone position, it is located and retained by the forces of the drive gear 16 and the braked retainer gear 17. After the gear workpiece 15 is in the work station or hone position, the guide springs 118 return to their normal position, and the loader means 73 remains in the advanced or forward position indicated by the broken lines 151 and 152. The angular guide edge 123 then functions as a guide means for the finish machined gear workpiece 15 during the ejection of the same from between the gears 16 and 17, as more fully described hereinafter.

When the loader or pusher plates 121 and 124 are in the advanced forward position indicated by the numerals 151 and 152 in FIG. 6, the switch engaging screw 148 contacts the arm 150 on switch 4PS to indicate that the forward travel of the pusher means is completed and that a gear workpiece 15 is located in the work station between the gears 16 and 17.

The gear workpiece 15 is clamped against endwise movement after it is loaded into the work station, as shown by the solid line position of the gear workpiece 15 in FIG. 6, by the following described clamping means. As shown in FIG. 8, the means for providing endwise or axial location for the gear workpiece 15 is generally indicated by the numeral 154 and it includes a base plate 155 that is supported on the base housing plate 11 and secured thereto by the socket head screws 166. Fixed on the top side of the base plate 155 is a vertical support plate 156 that is provided with the spaced apart, side support brackets 157. As viewed in FIG. 8, it will be seen that the support plate 156 operatively carriers a fixed-position roller 161 and an upwardly spaced apart movable clamp roller 179 for engaging the lower and upper end faces 165 and 182, respectively, of the gear workpiece 15 after it has been moved into the work station position between the gears 16 and 17. The rollers 161 and 179 may be made from any suitable material, as for example, carbide. The rollers 161 and 179 may be replaced with carbide shoes or similar means where grooves or the like have been machined into the end faces 165 and 182 of the gear workpiece 15. The rollers 161 and 179 take the thrust forces of the hereinafter described reciprocating nonrotating vertical bore honing tool that generates the center bore of the gear workpiece 15 concentric with the pitch circle of the workpiece 15.

The fixed-position roller 161 is supported on a vertically disposed arm 159 which is seated on a shoulder 158 on the right end of the support plate 156, as viewed in FIG. 8. The roller supporting arm 159 is secured to the support plate 156 by any suitable means, as by the socket head screws 160. The fixed-position roller 161 is rotatably mounted on the outer end of a threaded shaft 162. The shaft 162 is mounted through a hole 163 formed through the upper end of the arm 159 and it is secured thereto by the lock nut 164.

As shown in FIG. 8, the support plate 156 is provided on the left upper corner thereof with an upward extension 169 which has an upper end surface 170 on which is seated an actuating arm bracket generally indicated by the numeral 171. The bracket 171 includes the lower base or block portion 172 which is secured to the plate extension 169 by any suitable means, as by the socket head screws 176. As shown in FIG. 6, the upper end of the actuating arm bracket 171 is provided with an elongated slot 173 between the side walls 174 and 175. The mounting screws 176 are inserted through the slot 173. It will be seen that the actuating arm or lever 177 is provided with a narrow portion which is adapted to be inserted in the slot 173 and be pivotably supported between the walls 174 and 175 by a pivot shaft 178. As shown in FIG. 8, the clamp roller 179 is rotatably mounted on the outer end of a threaded shaft 180 which has its inner end threadably mounted in a threaded bore 181 formed on the front end of the actuating arm 177. As shown in FIG. 8, the actuating arm bracket 171 includes a rearward extension 185 in which is provided a vertical threaded bore 187 for the reception of a threaded stop shaft 186. The stop shaft 186 is adapted to be locked in an adjusted position by the lock nut 188. It will be seen that the shaft 186 limits the counterclockwise rotation of the actuating arm 177 about the pivot shaft 178.

As shown in FIGS. 6 and 8, the rear end 189 of the actuating arm 177 is attached to a suitable power means, as an air cylinder, generally indicated by the numeral 190. The air cylinder 190 is provided with a cylinder rod 191 which has its outer end threaded and mounted in a mounting adaptor 192. The cylinder rod 191 is secured in an adjusted position in the adaptor 192 by a lock nut 193. The adaptor 192 is provided with a threaded stud 194 which is threadably mounted in the threaded bore 195 formed on the lower side of the actuating arm rear end portion 189. The cylinder 190 is provided with a mounting shaft 196 on the lower end thereof which is seated in a recess 197 formed in a cylinder mounting bracket 199. The bracket 199 is fixed by any suitable means to the base plate 11. The cylinder shaft 196 is pivotally mounted on the cylinder bracket 199 by a pivot shaft 198. It will be seen that the air cylinder 190 pivots the actuating arm 177 about the pivot shaft 178 to lower or raise the clamp roller 179 for workpiece clamping or releasing action, respectively. The air cylinder 190 is pressure operated in an upward direction and spring returned in the downward direction.

FIG. 27 illustrates a modification of the clamping roll structure previously described and shown in FIG. 8. In the structure shown in FIG. 27, an air sizing transducer and gage unit 206 and a safety part-present switch 212 have been added. The actuating arm 177 of FIG. 27 is provided with a rearward extension 202 which carries on the upper rear end thereof an air gage head 203 that has a flat upper surface. Disposed above the gage head 203 in a position spaced apart therefrom is a conventional air sizing jet 204 which is carried on the end of a conduit 205. The air conduit 205 is attached to a conventional air sizing transducer and gage unit 206. The air sizing gage unit 206 is adapted to control the reciprocation and expansion of the abrading member or members used for honing the end faces of the gear workpiece 15, as explained more fully hereinafter. The air sizing gage unit 206 may be any standard air gage unit, as for example, an air transducer, and control means operated by the electrical signal provided by the transducer to give the desired control over the end face abrading means. An air gage combination unit of this type is available on the market under Model 881 from the Micromatic Hone Corporation of Detroit, Mich. As viewed in FIG. 27, it will be seen that the actuating lever 177 pivots clockwise about the pivot shaft 178 as the end faces on the gear workpiece 15 are honed, and that the gage head 203 moves toward the jet 204 to build up a back pressure in the conduit 205. The back pressure in the conduit 205 is sensed by a transducer in the gage unit 206 and converted to an electrical control signal at a predetermined pressure level and terminates the end facing operation.

The actuating arm 177 illustrated in FIG. 27 is also provided with a positive stop rod or member 209 which is shown as a threaded rod having its lower end mounted in a threaded bore 210 on the top side of the actuating arm 177 and locked in place by a lock nut 211. The upper end of the threaded rod 209 is adapted to engage the stop rod 208 which is carried on a suitable support bracket as 207 in a position normally spaced upward from stop rod 209. The positive stop members 208 and 209 limit the clockwise rotation of the actuating arm 177 in the event that the machine is actuated and a gear workpiece 15 is not in the work station for engagement by the fixed-position roller 161.

The support bracket 207 is fixed to a stationary part of the machine and it is adapted to carry a safety part-present switch 212 which is also termed limit switch 5LS hereinafter. The safety switch 212 is attached by the socket head screws 217 to a switch bracket 216. The switch bracket 216 is adjustably mounted on the support bracket 207 by means of the socket head screws 219 and the switch adjusting bracket 218. It will be seen that the safety switch 212 can be adjusted upwardly and downwardly relative to the actuating arm 177 so that its contact arm 213 will be in a position to be contacted if there is no gear workpiece 15 present in the work station between the drive gears 17 and 18. The switch 212 is adapted to be operated by a bolt 214 which is threadably mounted through a suitable bore in the actuating arm extension 202 and secured in place by the lock nut 215. When a machine cycle is initiated and the actuating arm 177 is rotated clockwise to move the clamp 16 downwardly, the switch 212 will be operated to shut the machine down or effect a recycling of the machine if the loading mechanism fails to index a gear workpiece 15 into the work station between the gears 16 and 17. It will be understood that the switch 212 is set at a position relative to the positive stops 208 and 209 so that it would be operated at a point in the swinging movement of the actuating lever 177 before the positive stops 208 and 209 engage each other.

The gears 16 and 17 are adapted to be rotated by the following described structure. As shown in FIG. 10, the drive gear 16 is mounted on a plate 222 which is formed on the upper end of a drive shaft 223. The braked gear 17 is mounted on a plate 225 which is formed on the upper end of the drive shaft 226. As shown in FIG. 6, the gears 16 and 17 are secured to their respective drive shafts 223 and 226 by the socket head screws 224 and 227, respectively.

As shown in FIG. 10, the drive shaft 226 is rotatably journalled in a pair of ball bearings 228 which are seated in a recess 229 formed in the upper end of a shaft housing 232. The bearings 228 are retained in the recess 229 by the circular retainer plate 230 which is releasably fixed to the upper end of the housing 232 by any suitable means. The shaft 226 carries a dust cover 231. The shaft housing 232 is seated in a bore 233 which is formed through the base plate 11. The housing 232 is secured to the base plate 11 by any suitable means.

The drive shaft 223 for the drive gear 16 is also rotatably journalled in bearings in the same manner as the shaft 226, and in a similar type housing generally indicated by the numeral 234. The housing 234 extends through a bore 235 in the base plate 11 and is secured in place by any suitable means.

As shown in FIG. 10, the shaft 223 is also rotatably supported at its lower end by a suitable ball bearing 236. The bearing 236 is seated in a recess 237 formed on the lower end of the housing 234. A lock nut 238 is threadably mounted on the threaded lower end of the shaft 223 and abuts the inner race of the ball bearing 236 to retain it in place. A spacer sleeve 240 is disposed about the shaft 223 and it engages the inner race of the upper ball bearing at the upper end of the shaft and the inner race of the lower ball bearing at the lower end of the shaft. The shaft 226 is provided also with a similar ball bearing at the lower end thereof which is retained in place on the threaded lower end 241 by the lock nut 242. A spacer sleeve 243 is provided also in the housing 232 and functions in the same manner as the spacer sleeve 240.

The gear shafts 223 and 226 are adapted to be selectively rotated by an electric motor 244 (FIG. 1) and the following described interconnecting drive structure. As shown in FIG. 1, the motor 244 is operatively connected by a chain and sprocket drive mechanism 245 to a vertically disposed drive shaft 246. As shown in FIG. 10, the shaft 246 carries a drive sprocket 247 which is meshed with and drives a chain 248 that is trained around two drive sprockets 249 and 249a which are mounted on the lower ends of the drive shafts 223 and 226, respectively, for free rotation thereabout. The sprockets 249 and 249a are selectively engaged and disengaged with the shafts 223 and 226 by the clutch means 250 and 251, respectively.

As shown in FIG. 10, the sprocket 249 is rotatably mounted on a reduced portion of the shaft 223 by a ball bearing 252. The bearing 252 is retained in place in a recess 253 formed on the lower side of the sprocket 249 by a retainer ring 254. The clutch means 250 includes a clutch drive member 255 which is substantially cylindrical and mounted around the shaft 223 and secured to the lower end of the sprocket housing by any suitable means, as by screws 256. The clutch means 250 further includes a clutch driven member generally indicated by the numeral 257, which includes a substantially cylindrical body portion that has a bore therethrough for slidably mounting the clutch driven member on the reduced lower end portion 258 of the drive shaft 223. The clutch driven member 257 is provided on the upper end thereof with a plurality of axially extended, spaced apart clutch teeth 260 which are adapted to mesh with and drive a plurality of identical mating teeth 260 formed on the lower end of the clutch drive member 255. FIG. 10 shows the clutch teeth 260 on the clutch drive member 255 in driving engagement with the clutch teeth 260 on the clutch driven member 257.

The clutch driven member 257 carries a transversely disposed drive pin 261 which passes through an axially extended, transverse slot 262 formed through the shaft lower end portion 258. The shaft end portion 258 is provided with an end bore 263 which extends axially inward from the lower end of the shaft 223 through the slot 262. A coil spring 264 is mounted in the shaft bore 263 and is retained therein by a screw plug 265. The lower end of the bore 263 is threaded and the tension on the spring 264 may be adjusted by turning the screw plug 265 inwardly or outwardly, as desired, and locking the same in place with the lock nut 266. It will be seen that the spring 264 urges the pin 261 upwardly and the pin 261 in turn moves the clutch driven member 257 upwardly for meshing its clutch teeth 260 with the clutch teeth 260 on the clutch drive member 255, to permit the rotating sprocket 249 to rotate the drive gear shaft 223. It will be understood that the clutch means 251 for driving the gear shaft 226 is constructed in the same manner and operates in the same manner as clutch means 250, with the exception that the spring 264 is not used in the clutch means 251. Accordingly, the corresponding parts of the clutch means 251 have been marked with the same reference numerals followed by the small letter a. The spring 264 normally maintains the clutch driven member 257 in driving engagement with the clutch drive member 255 of the clutch means 250. However, the clutch means 251 is normally not engaged during a workpiece loading and machining operation, as explained more fully hereinafter.

FIGS. 10 and 11 illustrate the mechanism for disengaging the clutch driven member 257 from the clutch drive member 255 against the pressure of spring 264 and for moving the clutch driven member 257a upwardly to mesh its clutch teeth 260a with the clutch teeth 260a on the clutch drive member 255a. As shown in FIG. 10, the clutch driven member 257 is provided with a pair of axially spaced apart flanges 267 and 268 which form a circular cam groove 269. As shown in FIG. 11, a pair of oppositely disposed cam rollers 273 and 274 are rollably mounted in the cam groove 269 at diametrically opposite positions. The roller 274 is rotatably mounted on one end of a shaft 275 which is mounted in the bore 276 formed in one end of a cam roller arm 277. A lock nut 278 secures the shaft 275 in place. The roller 273 is rotatably mounted on a shaft 279 which is mounted in the bore 280 in the cam roller arm 281 and secured in place by a lock nut 282. The clutch driven member 257a is made in the same manner as the last described cam operating structure for the cam driven member 257, and the corresponding parts have been marked with the same reference numerals followed by the small letter a.

As shown in FIG. 11, the cam roller arms 277 and 281 are mounted on the outer ends of a transversely disposed arm support plate 283. The arms 277 and 281 are secured to the horizontal arm support plate 283 by the socket head screws 284. The arm support plate 283 is provided with a central hole 285 in which is received the upper end of a center post 286. The arm support plate 283 is pivotally mounted on the upper end of the center post 286 by a pivot shaft 287. As shown in FIG. 10, the lower end of the center post 286 is reduced as indicated by the numeral 288, and this reduced post end is mounted in the bore 289 formed through the mounting plate 290. The shaft reduced end portion 288 is threaded and secured in place by the lock nut 291. As shown in FIG. 1, the mounting plate 290 is supported by a suitable bracket 292 which is mounted on the inside of the base housing 10.

As shown in FIG. 10, the cam roller support plate 283 is adapted to be pivoted from the position shown in FIG. 10 in a counterclockwise direction, to disengage the clutch means 250 and engage the clutch means 251, by a solenoid 293 which is also termed hereinafter electrical solenoid No. 5. As shown in FIG. 10, the solenoid 293 is fixed on the upper side of the mounting plate 290 and is provided with the usual plunger 294 which is hingedly connected to a threaded rod 295 that is connected to the bight portion 296 of a U-shaped or yoke connection member by the lock nuts 297. The yoke bight portion 296 is shown in FIG. 11 as being provided on the outer ends thereof with the upwardly extended legs 298 and 299 which are pivotally mounted on the outer ends of the pivot pins 300 and 301, respectively, which are mounted in the cam roller arms 281 and 277. It will be seen that when the solenoid 293 is energized, the plunger 294 will be pulled downwardly and the cam roller arm support plate 283 will be pivoted counterclockwise about the shaft 287 to move the clutch driven member 257 downwardly and disengage the same from the clutch drive member 255, and to engage the clutch driven member 257a with the clutch drive member 255a to terminate rotation of the drive gear shaft 223 and initiate rotation of the gear drive shaft 226.

The following described brake structure is provided for braking the gear shaft 226 during the workpiece loading and machining operations. As shown in FIG. 10, the lower end of the gear shaft 226 carries a brake band 304 around which is disposed a band of braking material 306 carried on a metal brake backing band 307. The brake backing band 307 is fixed to a brake arm 308. The brake arm 308 is secured to the cylinder rod 309 of a suitable air cylinder, generally indicated by the numeral 310. As shown in FIG. 1, the brake cylinder 310 is supported on a vertical support bar 311 fixed in the base housing 10.

It will be seen that the gear workpiece 15 is driven by the coaction of gears 16 and 17 in a centerless manner, and that these gears provide positive location for the gear workpiece 15 during a honing operation. The gears 16 and 17 are master gears and the centerless driving operation is based on the principle of using the pitch circle cylinder of the gear workpiece 15 as a base or fixture reference in finishing both the center bore and one or both of the end faces relative to the gear teeth pitch circle.

The two gears 16 and 17 are broadly two wheels which engage and rotate the gear workpiece 15 at the pitch circle. The invention can be used for carrying out two machining operations on other types of rotating workpieces, as for example, the inner race or inner ring of a ball bearing workpiece.

FIG. 32 illustrates the centerless driving or rotation of a bearing inner race workpiece generally indicated by the numeral 314. In the embodiment of FIG. 32 the two wheels are indicated by the numerals 312 and 313, and these wheels function in the same manner as the gears 16 and 17 for the previously described operation of honing the gear workpiece 15. As illustrated in FIG. 32, the wheels 312 and 313 would have a periphery shaped to mate with the outer periphery of the workpiece 314 so as to engage the workpiece 314 for driving engagement therewith at a circle which has been termed herein as a "characteristic circle," indicated by the numeral 315. The term "characteristic circle" is used herein as a generic term to indicate the base or fixture reference for the rotation of a workpiece and the simultaneous machining of a bore and one or both of the end faces of a rotating workpiece. The term "characteristic circle" is meant to include pitch circles of gear workpieces as well as other peripheral circles on the exteriors of rotating workpieces, as for example, circle 315 on workpiece 314.

It will be seen that since the gear workpiece 15 is centerlessly located between the two gears 16 and 17, and rigidly located by braking forces, that a certain degree of cold working or burnishing action is applied to the gear teeth on the workpiece to improve the surface finish characteristics of the gear teeth. The gear 17 may be made of a suitable material that would further the working of the surfaces of the gear teeth, as for example, it may be made from a bonded abrasive material, cast iron and the like.

HORIZONTAL MACHINING MEANS

The illustrative machine of the present invention is shown in FIG. 1 as including a horizontal machining means 14 comprising the four machining tools generally indicated by the numerals 318, 319, 320 and 321.

The horizontal machining tools 318, 319, 320 and 321 are constructed in the same manner and they operate in the same manner. Accordingly, only the horizontal machine tool 318 will be described in detail and the corresponding parts of the horizontal machining tools 319, 320 and 321 will be marked with the same reference numerals followed by the small letters a, b, and c, respectively.

Figure 12:
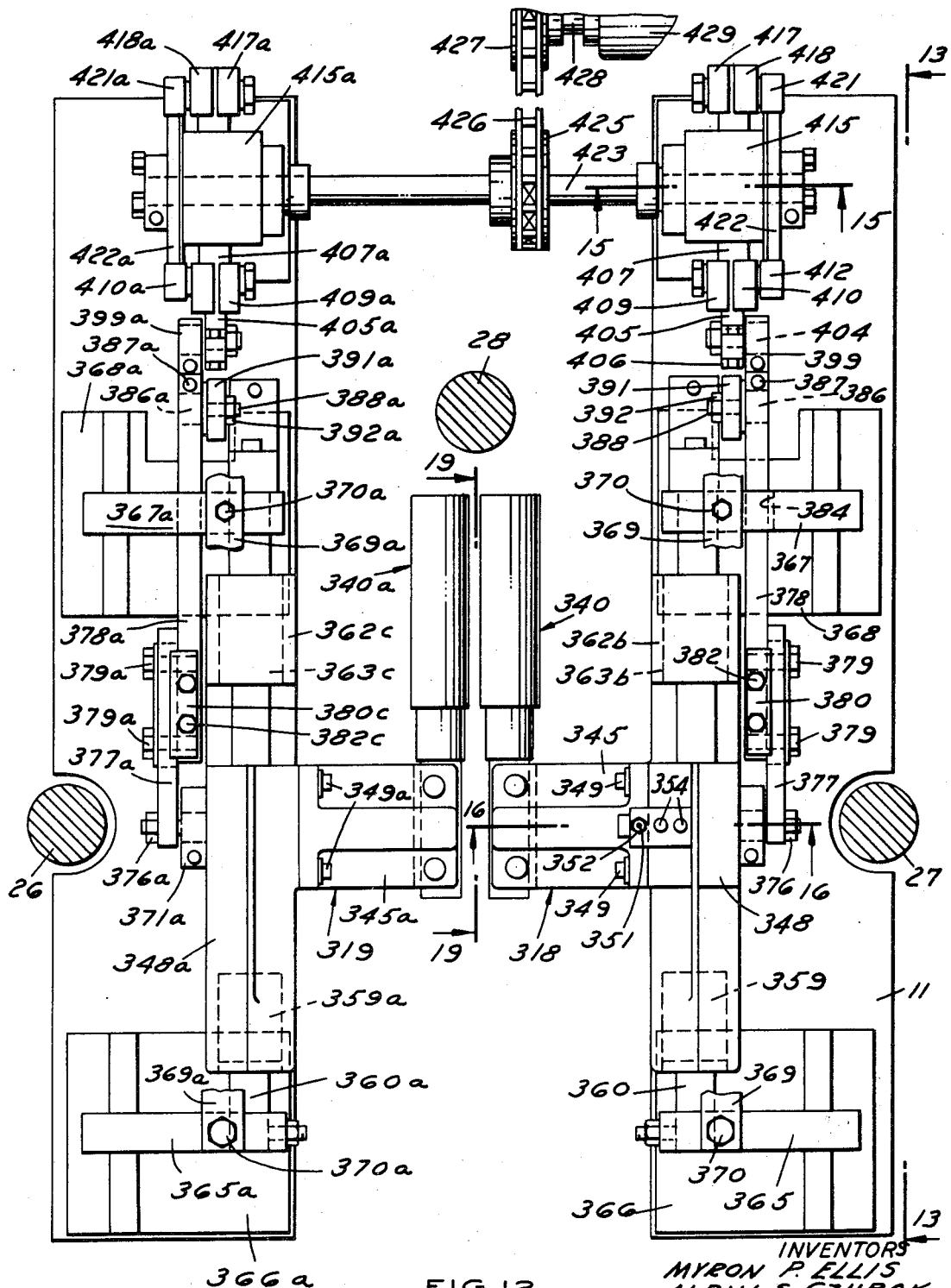
FIG. 12 is an enlarged, horizontal sectional view, with parts removed, of the structure illustrated in FIG. 1, taken along the line 12—12 thereof, and looking in the direction of the arrows.

FIG. 12 is a top view of the two upper horizontal machining tools 318 and 319. FIG. 12 illustrates the similar construction of the two upper horizontal tools 318 and 319. FIG. 13 is a right side elevational view of the structure of FIG. 12 and illustrates the similarity between the upper and the lower horizontal machining tools 318 and 320. FIG. 16 is a cross sectional view through the abrading tool holder structure of the horizontal machining tool 318, and it shows the honing stone or abrading tool 324 in sliding engagement with the upper end face 182 of the gear workpiece 15. As shown in FIG. 16, the honing stone or abrading tool 324 is disposed at approximately an angle of 24° from the vertical axis through the gear workpiece 15. The abrading tool 324 is carried in a tool body generally indicated by the numeral 325.

As shown in FIG. 17, the abrading tool 324 is slidably mounted between two guide plates 327 and 328 which are secured in a slot 331 formed in the tool body 325. The abrading tool 324 is expanded or advanced toward the workpiece end face 182 by an expander plate 332. As shown in FIG. 16, the expander plate 332 is provided with an angularly disposed slot 333 on the outer face thereof in which is cemented a thrust bar 334. The thrust bar 334 is adapted to be seated in a mating angularly disposed slot 335 in an expander cone plate 336, as shown in FIG. 17. As shown in FIG. 16, the cone plate 336 is slidably retained in a slot formed on the inner face of a retainer plate 337.

As shown in FIGS. 17 and 18, the cone plate 336 is adapted to be moved at right angles to the expander plate 332 so as to move the same inwardly and outwardly. The outer end of the cone plate 336 is secured by the pin 338 to the cylinder rod 339 of an air cylinder generally indicated by the numeral 340. As shown in FIGS. 17 and 18, the cylinder 340 is provided with a threaded mounting portion which is threadably mounted in the end bore 341 formed in the tool body 325. The tool body 325 is provided with a central axial bore 342 for the reception of the air cylinder rod 339. The end of the tool body 325 which is opposite to the air cylinder 340 is enclosed by a suitable plug 344. As shown in FIG. 16, the tool body 325 is secured to a tool bracket 345 by the socket head screws 346. As shown in FIGS. 19 and 20, the tool body 325 is further secured to the tool bracket 345 by the socket head screws 347. The cone plate 336 is shown in the retracted position in FIG. 19.

As shown in FIGS. 12 and 16, the tool bracket 345 is adjustably secured to an elongated slide 348 by the socket head screws 349. The tool bracket 345 is adapted to be positioned in a vertical direction by the adjustable screw 351 which is adapted to be locked in place by the lock nut 352. The screw 351 bears against the hardened button member 355. The adjustable screw 351 is threadably mounted in the plate 353 which is secured by the socket head screws 354 to the top of the slide 348. The numeral 350 indicates keys for guiding the vertical movement of the tool bracket 345.

As shown in FIGS. 13 and 16, the tool slide 348 is provided with a horizontal bore 361 in the end of which is mounted a bushing 359 for slidably mounting the slide 348 on a horizontal slide shaft 360. As shown in FIG. 13, the slide 348 is provided with an integral bracket 362 which is provided with a bushing 363, through which is mounted a second horizontal slide shaft 364. The horizontal slide shaft 364 is disposed in a position spaced downwardly from the top shaft 360.

As shown in FIG. 13, the front ends of the shafts 360 and 364 are fixed in a vertical support plate 365 which is fixed to a base plate 366 that is mounted on the base plate 11. The rear ends of the shafts 360 and 364 are fixed in a second vertical mounting plate 367 which is secured to a base plate 368 that is mounted on the base plate 11. The upper ends of the mounting plates 365 and 367 are fixed together by the horizontal strap 369 which is secured to said plates by the socket head screws 370.

The slide 348 is adapted to be reciprocated forwardly and backwardly by the following described structure. As shown in FIGS. 13 and 16, the slide 348 is provided with a side plate 371, in which is formed a roller bore 372. A roller 373 is operatively mounted in the bore 372 and is provided with a shaft 374 that extends through a bore in the bar 377 and which is secured in place by the nut 376. The plate 371 is secured to the slide 348 by screws 375. As shown in FIGS. 12 and 13, the bar 377 is attached to a second bar 378 by the bolts 379. The connection joint between the bars 377 and 378 is further provided with the aligning straps 380 and 381 which are adapted to maintain the bars 377 and 378 in axial alignment. The straps 380 and 381 are secured to the bar 378 by the bolts 382 and the nuts 383.

Figure 14:
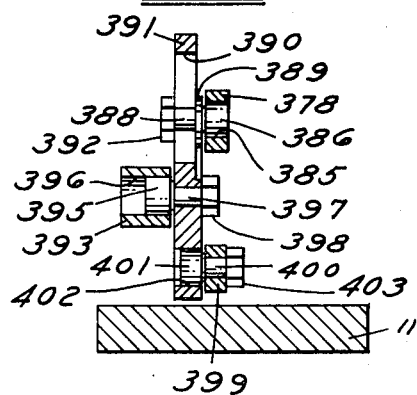
FIG. 14 is a fragmentary, elevational section view of the structure illustrated in FIG. 13, taken along the line 14—14 thereof, and looking in the direction of the arrows.

As shown in FIGS. 13, the oscillating bar 378 extends rearwardly through the opening 384 which is formed in the mounting plate 367. As shown in FIGS. 13 and 14, the rear end of the horizontal oscillating bar 378 is provided with a transverse bore 385 in which is operatively mounted a roller 386. The rear end of the bar 378 is slotted and pressure may be exerted on the roller 386 by means of the socket head screw 387 as shown in FIG. 13. As shown in FIG. 14, the roller 386 is provided with a mounting shaft 388 that extends through a longitudinal slot 390 formed in a vertical oscillating arm 391. The shaft 388 is secured in an adjusted position in the slot 390 by the lock nut 392. A washer 389 spaces the roller 386 from the arm 391.

As shown in FIGS. 13 and 14, the vertical oscillating arm 391 is pivoted on a fulcrum bracket 393 which is secured by the socket head screws 394 to the rear face of the vertical mounting plate 367. As shown in FIG. 14, the fulcrum bracket 393 is provided with a bore 396 in which is operatively mounted a roller 395 that is carried on the shaft 397. The shaft 397 extends through a central bore on the vertical arm 391 and is secured thereto by the lock nut 398.

As shown in FIGS. 13 and 14, the lower end of the vertical oscillating arm 391 is pivotally mounted to the front end of a lower link 399. As shown in FIG. 14, the lower end of the vertical arm 391 is provided with a bore 402 in which is operatively mounted a roller 401 that is carried on a shaft 400. The shaft 400 extends through the front end of the link 399 and is secured thereto by the lock nut 403. The rear end of the lower link 399 is rotatably connected by a roller 404 to the lower end of a vertical slide plate 405. The slide plate 405 is connected by socket head screws 406 to the front ends of a pair of slide shafts 407 and 408. As illustrated in FIG. 12, the front end of slide shaft 407 is held between two vertically disposed roller support plates 409 and 410 which are secured together by the socket head screws 411 (FIG. 13). As shown in FIG. 13, the lower slide shaft 408 is also secured at the front end thereof between the roller support plates 409 and 410. A cam roller 412 is rotatably carried by the roller support plates 409 and 410 and is disposed on a horizontal axis so as to extend sideward outwardly from the support plate 410, as viewed in FIGS. 12 and 13.

As shown in FIG. 13, the vertically spaced apart slide shafts 407 and 408 are slidably mounted for reciprocating action in the ball bearing bushings 413 and 414, respectively, which are operatively mounted in a vertical roller support plate 415. The support plate 415 is mounted on a base plate 416 which is secured to the base plate 11. As shown in FIG. 12, the rear ends of the slide shafts 407 and 408 are also connected by roller support plates 417 and 418 which are connected together by the socket head screws 419 (FIG. 13). The slide shafts 407 and 408 are also secured to the roller support plates 417 and 418 by the socket head screws 420 and suitable washers. As shown in FIGS. 12 and 13, the roller support plates 417 and 418 also operatively carry a cam roller 421 which extends sidewardly outward in a position aligned horizontally with the cam roller 412.

Figure 15:
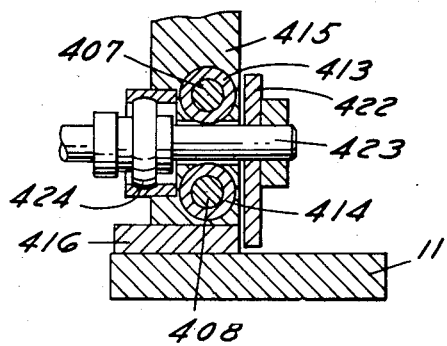
FIG. 15 is a fragmentary, elevational section view of the structure illustrated in FIG. 12, taken along the line 15—15 thereof, and looking in the direction of the arrows.

As shown in FIGS. 12 and 13, a constant motion cam 422 is fixed to the outer end of a drive shaft 423. The drive shaft 423 is rotatably mounted in a suitable bearing means 424, as shown in FIG. 15. As shown in FIGS. 2 and 12, the drive shaft 423 carries a sprocket 425 which is driven by a chain 426. The chain 426 is driven by a sprocket 427 which is carried on the output shaft 428 of an electric drive motor 429. As shown in FIG. 2, the chain 426 also is extended downwardly and around the sprocket 425b on the lower shaft 423b for driving the lower set of horizontal machining tools 320 and 321.

It will be seen that as the cam 422 rotates, it will provide an oscillating motion to the shafts 407 and 408 which in turn transmit such motion to the link 399. The link 399 oscillates the vertical arm 391 about the shaft 397 to impart a reciprocating motion to the rod 378 that is transmitted to the tool slide 348. It will be seen that all of the horizontal machining tools 318, 319, 320 and 321 will be simultaneously oscillated over the end faces of the workpiece 15 by the last described structure. The stroke of the rod 378 may be varied by adjusting the position of the shaft 388 in the slot 390.

FIGS. 30 and 31 illustrate another embodiment of a drive means which may be employed to provide reciprocating motion to the tool slide reciprocating drive rod 377. As shown in FIGS. 30 and 31, the rear end of the reciprocating rod 377 is provided with a bore in which is seated a suitable bushing or bearing 430. A shaft 431 is extended through the bearing 430 and it carries an enlarged head 433 that is slidably mounted in an inwardly extended, undercut portion 435 of a radial slot 434 which is formed in a rotatable round block 436. The shaft 431 is threaded on the outer end thereof and is provided with a lock nut 432 that is adapted to lock the shaft 431 in an adjusted position in the radial slot 434. It will be understood that the bearing 430 is longer than the width of the bar 377 so that the bar 377 may freely rotate on the shaft 431.

As illustrated in FIG. 31, the rotatable block 436 is provided with a driving, mounting shaft 437 that is rotatably mounted in a suitable bushing or bearing means 438 in a vertical support plate 439. The shaft 437 is provided with a threaded portion 440 which carries a lock nut 441 and a thrust washer 442 for securing the shaft 437 axially in place relative to the support plate 439. The bearing 438 would be formed to provide rotational clearance between the support plate 439 and the rotating block 436 and the washer 442. The splined end 443 of the shaft 437 is operatively connected to the output shaft 445 of a suitable electric drive motor 446.

It will be seen that as the rotary block 436 is rotated by the motor 446, the rod 377 will be provided with an oscillating motion and with an oscillating stroke of a length in accordance with the radial position at which the shaft 431 is locked in the slot 434.

FIGS. 28 and 29 illustrate a modified tool body 449 for operatively mounting an end face abrading tool 447 at an angle relative to the center bore axis of a rotatable workpiece. The tool 447 can be mounted at the shown angle of 45° or any angle up to the vertical. In the tool holder embodiment of FIGS. 28 and 29, the tool advancing pressure is exerted in an axial position relative to the abrading tool 447. As shown in FIG. 29, the abrading tool 447 is slidably mounted in the slot 448 formed on the top face of the tool body 449. The abrading tool 447 is retained in the slot 448 by a retainer plate 450 that is secured to the tool body 449 by the socket head screws 451. The abrading tool 447 is adapted to be advanced toward a workpiece by pressure created by an expander plate 452 which has the front end thereof slidably mounted in the slot 448 and in pushing engagement against the rear end of the abrading tool 447. The expander plate 452 is adapted to be advanced and retracted by a suitable air cylinder generally indicated by the numeral 455. The air cylinder 455 is provided with a cylinder rod 454 that is connected to the rear end of the expander plate 452 by a screw 453. It will be seen from FIG. 29 that the abrading tool 447 is loaded into the slot 448 by moving the tool 447 sidewardly inward into the slot 456 when the expander plate 452 is retracted and then moving the abrading tool 447 axially downward into the slot 448.

VERTICAL MACHINING MEANS

The illustrative machine of the present invention is shown in FIG. 1 as including a vertical machining means 13 which comprises a tool body assembly generally indicated by the numeral 460, a lateral movement adaptor 461, a nonrotating tool spindle 462, and a machine head or spindle head 55.

As shown in FIGS. 1, 22 and 23, the tool body 460 includes an elongated, cylindrical lower end portion 463 which is integral at its upper end with a substantially rectangular middle portion 464. As shown in FIG. 1, the middle portion 464 has a front view thickness approximately equal to the lower end portion 463. FIG. 22 shows that the middle portion 464 has a side view thickness of about three times the thickness of the lower end portion 463 to provide the aforementioned rectangular shape. As shown in FIG. 1, the upper end portion 465 of the tool body 460 is circular. The tool body 460 is connected by screws 467 to a tool coupling 466. The tool coupling 466 connects the tool body 460 to an adaptor manifold 468 which in turn is connected to an adaptor float plate 469 as shown in FIG. 23. The tool coupling 466 is connected to the adaptor manifold 468 and the float plate 469 by any suitable means as by the screws 470 as shown in FIG. 22.

As shown in FIG. 22, the tool body lower portion 463 operatively carries two abrading members or tools 471 and 472. As shown in FIG. 3, the abrading tool 471 is disposed on a plane which is substantially parallel to a centerline 476 connecting the center axes of the drive gears 16 and 17. As more fully described hereinafter, the floating adaptor 461 functions to maintain the abrading members 471 and 472 in the aforementioned disposition relative to the center axes of the driving gears 16 and 17 and yet permit the tool body 460 to float laterally or perpendicularly to the centerline 476, along a perpendicular line indicated by the numeral 477 in FIG. 6.

FIG. 23 is an elevational section view of the structure illustrated in FIG. 22, taken along the line 23—23 of FIG. 22, but showing the tool body 460 turned 90° to the right as viewed in FIG. 23, so as to bring the front abrading member 471 into a side view position for purposes of illustration and description. FIG. 24 is a cross sectional view of the turned tool body 460, looking upwardly, and showing the flat sides 473 and 474 of the tool body lower portion 463. The sides 473 and 474 of the lower tool body portion 463 are formed flat to provide clearance for the end facing tools as 324 and 324a. The tool body portions 463, 464 and 465 are made in two half-portions which are joined along the joint line 475 as shown in FIG. 3.

As shown in FIG. 23, the abrading member 471 comprises a honing stone which is operatively mounted in a holder 479 that is disposed in the lower end of an axially extended slot 478 in the tool body lower end portion 463. The abrading member 471 could be a one-piece abrading member. The honing stone 471 extends outwardly through an elongated slot 480 for honing engagement with the center bore 481 of the gear workpiece 15. The inner vertical face of the tool holder 479 slopes downwardly in one direction and it is engaged by a mating cone surface 482 on the lower end of an expander blade 483 which is slidably mounted in the slot 478. It will be seen that as the expander blade 483 is moved downwardly, the honing tool 471 will be expanded outwardly into abrading engagement with the center bore 481.

The expander blade 483 is moved upwardly and downwardly by a driver blade 485 which has its inner end seated in a slot 484 formed in the outer side of the expander blade 483. The outer end of the driver blade 485 is seated in a transverse slot 486 in a piston rod 488. A screw 487 secures the blade 485 in place. The piston rod 488 is slidably mounted in an elongated bore 489. As shown in FIG. 23, the piston rod 488 extends upwardly through the coupling 466 and into a piston cylinder 490. The upper end of the piston rod 488 is operatively connected as by the piston pin 492 to an air cylinder piston 491. As shown in FIG. 23, fluid under pressure is supplied to the cylinder 490 for moving the piston 491 upwardly and downwardly through the ports 493 and 494. The ports 493 and 494 are connected to a suitable source of fluid under pressure, as for example the pneumatic circuit shown in FIG. 33. It will be understood that the other abrading member or honing stone 472 is identical to the abrading member 471 and that it is expanded by similar structure. The air cylinder structure for expanding the honing stone 472 has been marked in FIG. 23 with the same reference numerals as used in marking the structure for expanding the honing stone 471, followed by the small letter a. As shown in FIG. 23 and in the pneumatic control circuit of FIG. 33, the two air cylinders formed by the last described structure for expanding the honing tools 471 and 472 are generally indicated by the numerals 495 and 496.

Figure 33:
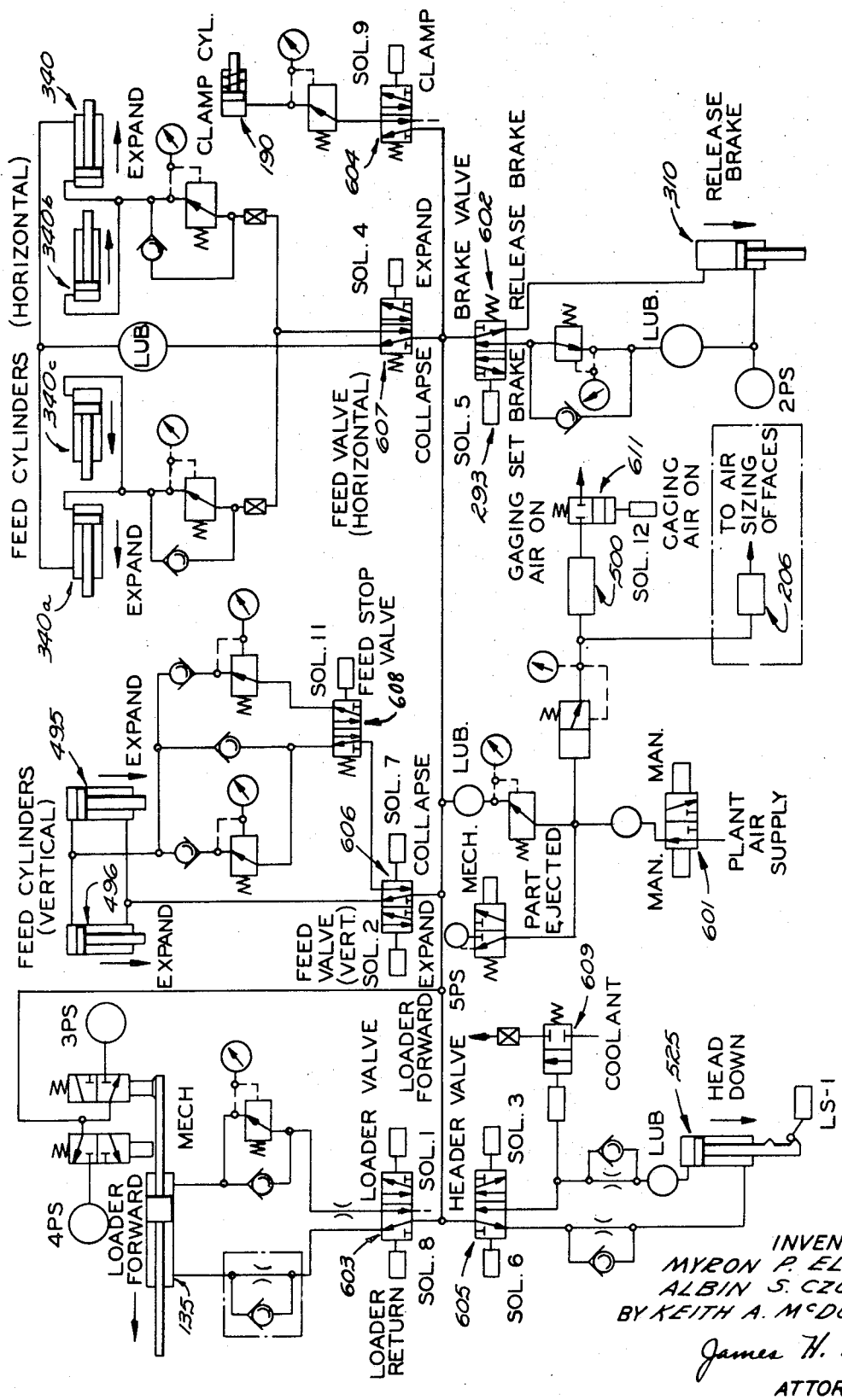
FIG. 33 is an illustrative pneumatic control circuit employed in controlling the machine of the present invention; and, FIGS. 34 and 35 comprise an illustrative electrical control circuit for controlling the operation of the illustrative machine made in accordance with the principles of the present invention.

As shown in FIG. 23, the tool body lower portion 463 is provided with an air sizing jet 497 which is operatively connected through suitable passages as 498 to a conventional air transducer and sizing gage unit generally indicated by the numeral 500, in the pneumatic control circuit of FIG. 33. As shown in FIG. 24, a second air sizing jet 499 is also carried in the tool body lower end portion 463. The air sizing gage unit 500 may be of any suitable conventional type, as for example, the aforementioned gage unit 206 which is used for air sizing the end faces of the gear workpiece 15.

Figure 26:
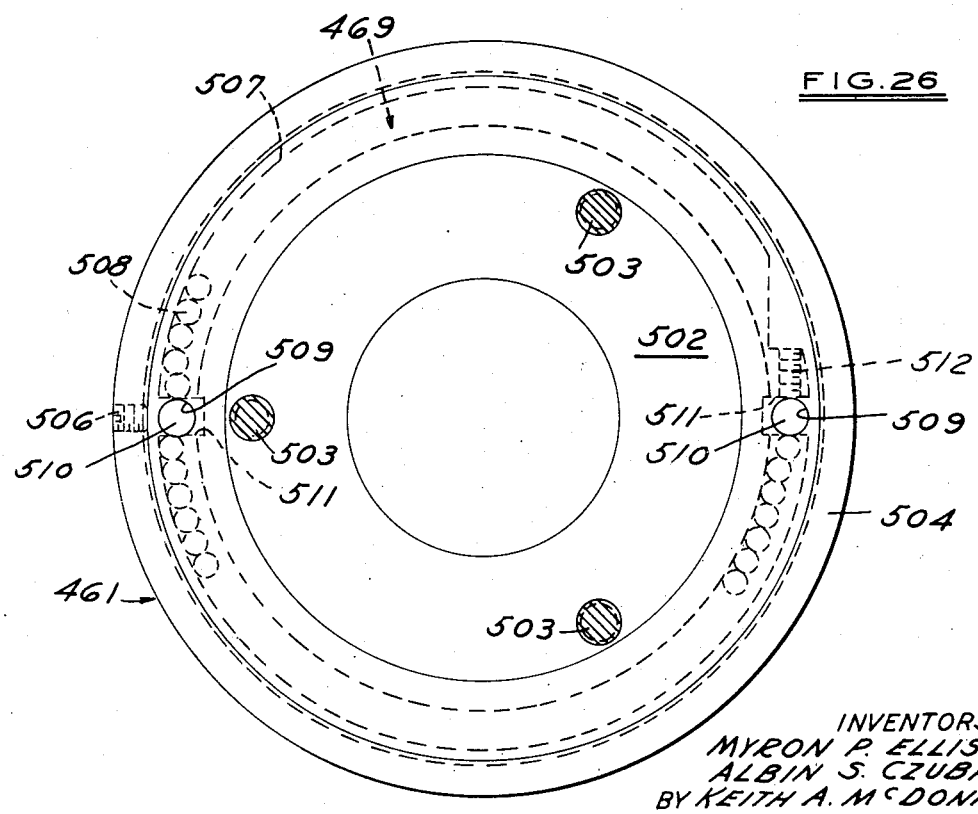
FIG. 26 is an enlarged, horizontal section view of the adaptor structure illustrated in FIG. 23, taken along the line 26—26 thereof, and looking in the direction of the arrows.

The details of the construction of the lateral float adaptor 461 are shown in FIGS. 23 and 26. The adaptor 461 includes an upper rigid circular plate 502 which is secured by the screws 503 to a circular attachment plate 501 which is carried on the lower end of the spindle 462. A circular retainer nut 504 is threadably mounted around the periphery of the circular plate 502, and is secured in place by a set screw 506. The retainer nut 504 is provided with an inwardly extended peripheral flange 505 which is extended under the outer periphery of the circular plate 502. The float plate 469 has its upper end disposed within the lower portion of the retainer nut 504 and is provided with a circular flange 507 that is disposed above the retainer flange 505. A plurality of steel balls 508 are supported by and between the retainer flange 505 and the flange 507.

As shown in FIGS. 23 and 26, the circular plate 502 is provided with a pair of axially disposed dowel holes 509 in which are mounted a pair of dowel pins 510. The dowel pins 510 extend downwardly into a pair of dowel slots 511 which are formed through the flange 507 on the float plate 469. It will be seen that the dowel pins 510 prevent rotation of the float plate 469 relative to the circular plate 502. The set screw 512 in FIG. 26 provides an adjusting means for eliminating any looseness between the dowel pins 510 and the slots 511. It will be seen from an inspection of FIG. 26 that the dowel pins 510 permit the float plate 469 to move laterally along a line connecting the centers of the dowel pins 510 to provide the tool body 460 with the aforementioned floating action.

Figure 25:
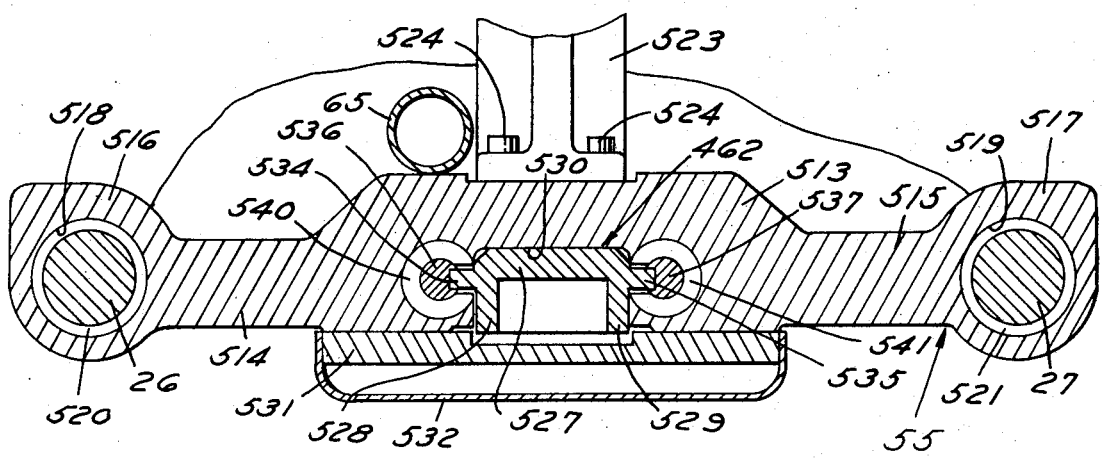
FIG. 25 is a fragmentary, reduced, horizontal section view of the structure illustrated in FIG. 23, taken along the line 25—25 thereof, and looking in the direction of the arrows.

As shown in FIG. 25, the machine head or spindle head 55 includes a body portion 513 which is provided with a pair of integral, laterally extended arms 514 and 515. The arms 514 and 515 are provided at the outer ends thereof with the integral bosses 516 and 517 through which are formed the individual bores 518 and 519. The bosses 516 and 517 are slidably mounted on the front vertical guide bars 26 and 27 by the bushings 520 and 521. As shown in FIG. 2, the machine head 55 is further supported by a pair of vertically spaced apart rear support brackets 522 and 523 which are slidably mounted by suitable bearing means on the rear vertical guide bar 28. As shown in FIGS. 21 and 25, the brackets 522 and 523 are secured to the rear side of the body 513 by the screws 524.

As shown in FIGS. 1 and 2, the machine head 55 is adapted to be raised upwardly and downwardly by an air cylinder 525 which is mounted on the top end of the machine and supported on the cover plate 29, or any other suitable supporting means. The air cylinder 525 is provided with a cylinder rod 526 which is connected to the body 513 of the machine head 55, as shown in FIGS. 2 and 21.

As shown in FIGS. 23 and 25, the spindle 462 comprises an elongated body having an integral rear plate 527, a left side plate 528 and a right side plate 529. The rear plate 527 is provided with lightening holes as shown in FIG. 23. The spindle 462 is slidably mounted for vertical movement relative to the machine head body 513 in a vertical slideway 530 that is enclosed on the front side thereof by a front plate 531. The front plate 531 is secured to the spindle body 513 by the screws 533 (FIG. 21), and it is enclosed by a front cover 532.

As best seen in FIG. 25, the spindle 462 is provided on each side thereof with an outwardly extended lug, as 534 and 535, which is seated in a recess in one of the pair of circular spindle guides 536 and 537. As shown in FIG. 23, the spindle guides 536 and 537 are secured to the spindle 462 by the socket head screws 538 and 539. As shown in FIG. 23, the spindle guides 536 and 537 are slidably mounted in a pair of vertical bores 542 and 543 which are disposed on opposite sides of the spindle slideway 530 and communicate therewith. The spindle guides 536 and 537 are slidably supported at the top and bottom ends thereof by suitable bushings as illustrated by the bushings 540 and 541 in FIG. 23.

The tool spindle 462 is reciprocated upwardly and downwardly by an oscillating vertical bar 548. As shown in FIG. 22, the oscillating bar 548 is provided at its lower end with a bore 549 in which is operatively mounted a roller 550 that carries a shaft 551 which extends through the spindle rear wall 527 and is secured thereto by the nut 552. The upper end of the oscillating bar 548 is provided with a bore 553 in which is operatively mounted a roller 554 which is carried on a shaft 555 that is extended through a slide bar 556 and secured thereto by the nut 557. The slide bar 556 is carried in a horizontal oscillating bar 558 as shown in FIG. 1. As best seen in FIG. 21, the horizontal oscillating bar 558 is provided with a longitudinal slot 559 in which is seated the slide bar 556. The slide bar 556 may be moved longitudinally in the slot 559 to adjust the position of the slide bar 556 relative to the bar 558 for alignment purposes. The slide bar 556 is secured to the oscillating bar 558 by the screws 560. As shown in FIGS. 1 and 21, the oscillating bar 558 is carried on a shaft 561 and is secured thereto by the nut 563. As shown in FIG. 21, the shaft 561 carries a roller 562 which is operatively mounted in the bore 564 formed in the fulcrum or pivot bracket 565. The bracket 565 is fixed to the upper end of the spindle body 513.

The horizontal oscillating bar 558 is pivoted about the axis of the shaft 561 by the following described structure. As shown in FIG. 21, the right end of the oscillating bar 558 is provided with a longitudinally extended slot 567 in which is mounted a slide bar 568. The slide bar 568 carries a shaft 570 which is secured thereto by a nut 571. The shaft 570 carries a roller 572 on the rear side thereof which is operatively mounted in the upper end of the upper vertical slide arm 573. As shown in FIG. 1, the lower end of the slide arm 573 carries a roller 574, which is operatively carried on the shaft 575 as shown in FIG. 21. The shaft 575 is secured through the upper end of the lower vertical slide arm 576 by the nut 577.

As shown in FIG. 22, the lower end of the slide arm 576 is secured to the horizontal bar 578 that is fixed by screws 579 to the upper ends of the slide shafts 580 and 581. The upper ends of the slide shafts 580 and 581 are secured together by a pair of roller support plates 582 which are constructed in the same manner as the previously described roller support plates 417 which are employed in the reciprocation means for the horizontal tools. The roller support plates 582 are secured together by the screws 583. The roller support plates 582 carry a cam roller 584. The lower ends of the slide shafts 580 and 581 are secured together by a pair of roller support plates 585 which are identical to the roller support plates 582. The roller support plates 585 are secured together by the screws 586. The lower ends of the slide shafts 580 and 581 are secured against axial movement relative to the roller support plates 585 by the screws 587. The roller support plates 585 carry a cam roller 588.

As shown in FIGS. 21 and 22, the slide shafts 580 and 581 are slidably mounted in a slide shaft support block 589 which is fixed by any suitable means to the rear side of the spindle body 513. A cam, such as the constant motion cam 590, is fixed on the shaft 593 in a position for engaging the cam rollers 584 and 588 to provide vertical oscillating motion to the lower vertical slide arm 576. As shown in FIG. 21, the cam shaft 593 is operatively supported by a pair of shaft bearing mounts 594. The shaft 593 has fixed thereto a sprocket 595 which is driven by the chain 596. The chain 596 is driven by the sprocket 597 which is carried on the output shaft 598 of a suitable electric drive motor 599. It will be seen that when the motor 599 is energized the cam 590 will be rotated and the lower vertical slide arm 576 will be moved upwardly and downwardly. The vertical oscillation movement of the arm 576 is transmitted by the upper vertical slide arm 573 to the horizontal oscillating arm 558 which transmits the oscillating motion to the tool spindle 462 through the rollers 550 and 554 and the vertical oscillating bar 548.

OPERATION

Figure 34:
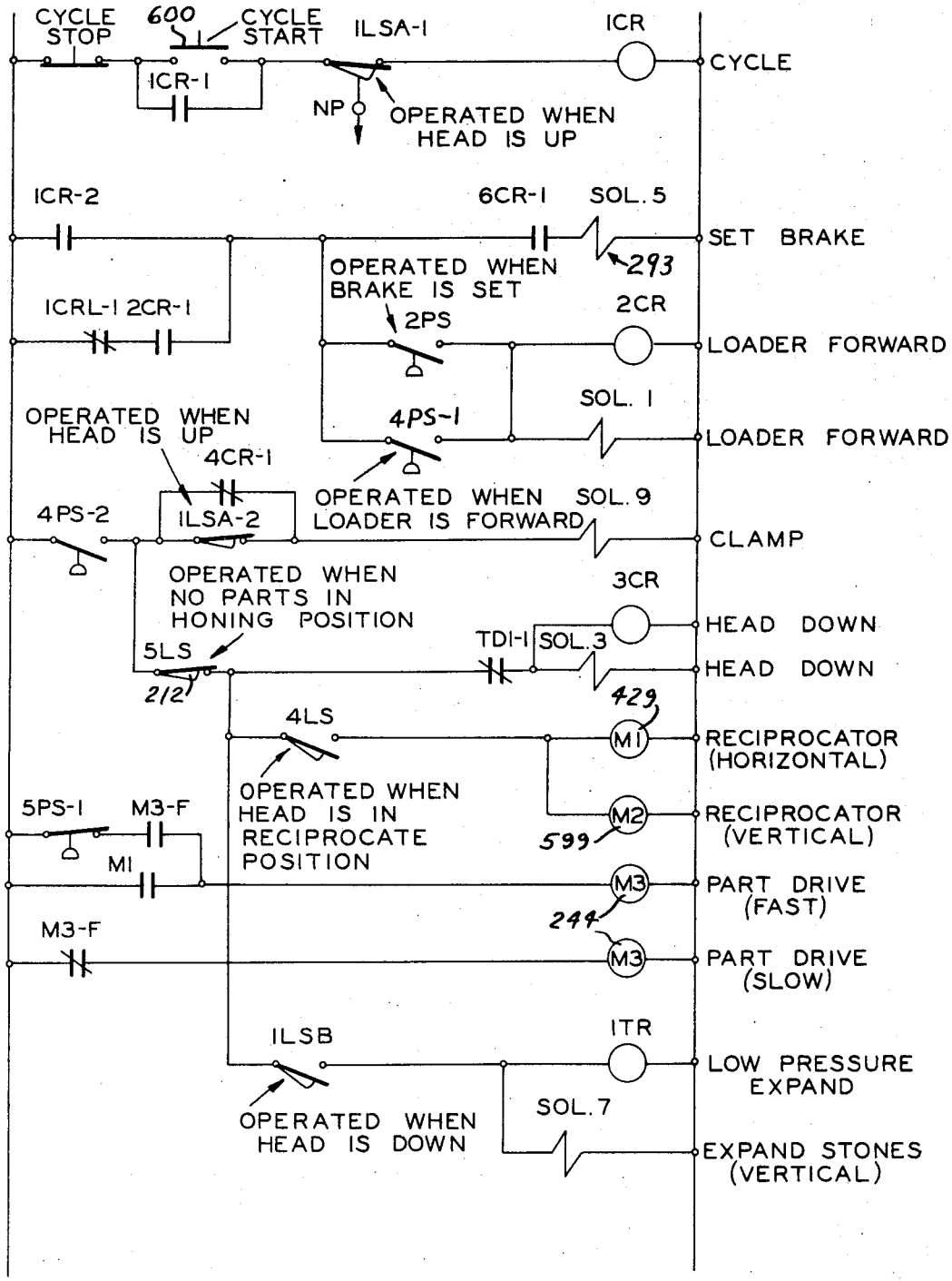
Figure 35:
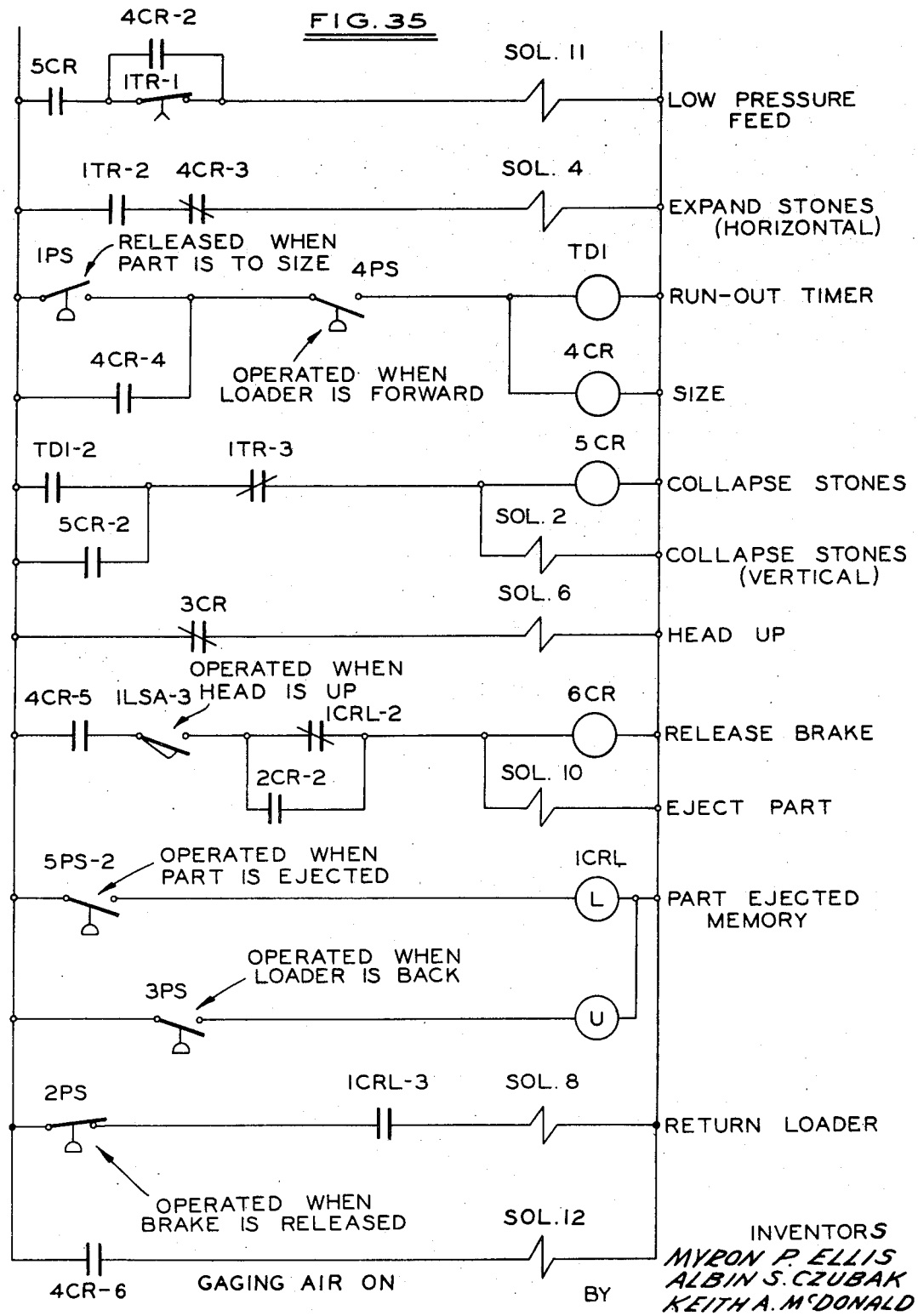

FIGS. 34 and 35 show an illustrative electrical control circuit for automatic operation of the illustrative honing machine of the present invention. FIG. 33 shows an illustrative pneumatic control circuit. It will be understood that any suitable electrical control circuit and any suitable pneumatic control circuit may be used. The first half of the electrical control circuit is shown in FIG. 34, and the second half is shown in FIG. 35.

The following is a sequence of electrical, pneumatic and mechanical operations which take place during a typical automatic honing cycle of the illustrative gear honing machine. The plant air supply valve 601 shown in FIG. 33 is manually operated by the operator to pressurize the pneumatic circuit shown in FIG. 33. The operator of the machine presses the cycle start button 600 (FIG. 34) and the cycle relay 1CR becomes energized. Relay contact 1CR-2 then closes and energizes solenoid 293 (Solenoid No. 5) to actuate brake valve 602 (FIG. 33), setting the brake retainer gear 17 by supplying air to the brake air cylinder 310. The switch 2PS is actuated after the brake retainer gear 17 is set, energizing relay 2CR and solenoid No. 1 which operates the loader valve 603 for actuating the loader cylinder 135 to load a gear workpiece 15 between the gears 16 and 17, as described hereinbefore.

Switch 4PS-1 (FIG. 34) is actuated after the load cylinder 135 is forward, energizing solenoid No. 9 which operates the clamp valve 604 (FIG. 33) for operating the clamp cylinder 190 to move the upper clamping roller 179 downward into clamping engagement with a gear workpiece 15 in the work station between the gears 16 and 17. If a gear workpiece 15 is in the work station, limit switch (212) 5LS remains released, thereby energizing relay 3CR and solenoid No. 3. Solenoid No. 3 actuates the head valve 605 (FIG. 33) which operates cylinder 525 to advance the machine head 55 downwardly into a machining or honing position. When the machine head 55 has reached the reciprocate position, the limit switch 4LS (FIG. 34) is actuated to energize the electric motors 429, 599 and 244 for reciprocating the horizontal and vertical tools and for rotating the gear workpiece 15 between the drive gear 16 and the brake retainer gear 17. When the machine head 55 has reached the extent of its travel, limit switch contact 1LS (B) (FIG. 34) is actuated to energize relay 1TR and solenoid No. 2 to actuate the vertical feed valve 606 (FIG. 33) to operate cylinders 495 and 496 for expanding the vertical honing stones 471 and 472. Relay contact 1TR-2 (FIG. 35) is then closed to energize solenoid No. 4 which actuates the horizontal feed valve 607 (FIG. 33) to expand the horizontal honing stones 324, 324a, 324b and 324c. Timer contact 1TR-1 (FIG. 35) then times open to de-energize solenoid No. 11 to actuate the feed valve 608 (FIG. 35) to operate vertical feed cylinders 495 and 496 to start a high pressure feed. After the gear workpiece 15 has been honed to size, switch 1PS (FIG. 35) is released, thereby energizing run-out timer TD1 and size relay 4CR. Relay contact 4CR-2 is then closed energizing solenoid No. 11 which actuates valve 608 for applying a low feed pressure to the vertical feed cylinders 495 and 496. Relay contact 4CR-6 (FIG. 35) is also closed to energize solenoid No. 12 to operate valve 611 for turning on the air for the gauging unit 500 (FIG. 33). A similar solenoid would be used for turning on the gauging air to the gauge unit 206, if that gauging unit were used for sizing the end faces of the gear workpiece 15. Relay contact 4CR-3 (FIG. 35) opens to de-energize solenoid No. 4 to actuate the valve 607 (FIG. 33) to collapse the horizontal feed cylinders 340, 340a, 340b and 340c. Timer contact TD1-2 (FIG. 35) also closes to energize relay contact 5CR and solenoid No. 2 to operate valve 606 (FIG. 33) to collapse the vertical feed cylinders 495 and 496.

Upon termination of the runout timing device, contact TD1-1 (FIG. 34) then opens to de-energize relay 3CR and solenoid No. 3 and energize solenoid No. 6 to actuate valve 605 (FIG. 33) to operate the head cylinder 525 and withdraw the machine head 55 from the workpiece 15. After the machine head 55 has sufficiently cleared the workpiece 15, limit switch contact 1LS-B (FIG. 34) is released, dropping out timer 1TR and solenoid No. 11 and solenoid No. 7 to operate valve 606 (FIG. 33), and energize solenoid No. 11 to operate the valve 608 (FIG. 33), to collapse the vertical feed cylinders 495 and 496. Limit switch 4LS is released to de-energize the electric motor 429 (FIG. 34) and the electric motor 599, to thereby stop the horizontal and vertical tool reciprocation. After the machine head 55 has withdrawn, limit switch contact 1LSA-2 (FIG. 34) is opened, de-energizing solenoid No. 9 which actuates valve 604 (FIG. 33) to cut off the pressure to the clamp cylinder 190 and withdraw the clamp roller 179. Limit switch contact 1LSA-3 (FIG. 35) is closed, thereby energizing relay 6CR and de-energizing solenoid No. 5 to operate brake valve 602 (FIG. 33) to release the brake cylinder 310 and eject the finished gear workpiece 15. The power drive to the drive gear 16 is de-clutched and a power drive to the gear 17 is engaged. The reaction to this driving arrangement is a carrying of the finished gear workpiece 15 away from the honing or work station shown in FIG. 6 and in the direction of the rotation of gear 17 to eject the workpiece 15. The direction of ejection of the workpiece 15 is determined by the loader guide plate edges 152 and 109 (FIG. 6). The ejected workpiece 15 is carried along the exit channel until it contacts switch contact member 117 on switch 5PS.

At the indication that a workpiece 15 has been ejected from the work station, the switch contact 5PS-1 (FIG. 34) is actuated and the drive gear motor 244 (FIG. 34) reverts to a slower load speed, with motor winding M3-F being de-energized and motor winding M3-S being energized. Switch contact 5PS-2 (FIG. 35) is actuated to energize relay contact 1CRL which de-energizes relay 2CR and solenoid No. 1 and energizes solenoid No. 8 to actuate the loader valve 603 (FIG. 33) which operates the loader cylinder 135 to move to the return position. After the loader cylinder 135 has withdrawn, switch 3PS (FIG. 35) is actuated to unlatch relay 1CRL to complete the cycle.

As shown in FIG. 33, the pneumatic circuit includes a valve 609 for controlling the flow of coolant to a suitable coolant discharge means for cooling the honing tools and workpiece, as for example, the coolant nozzle 610 shown in FIG. 1.

It will be seen that the machine of the present invention eliminates a number of individual operations which were heretofore necessary to remove heat treat distortion of rotating workpieces, as for example, gears. The machine of the present invention eliminates the separate required steps of honing the bores, the end faces and the teeth. The machine of the present invention combines all these finishing operations in a single centerless honing operation. The positive positioning of the workpiece 15 improves the bore to pitch circle relationship and provides a substantial correction of lead errors. The workpiece driving arrangement is of such a nature that an exact relationship of the gears 16 and 17 and the gear workpiece 15 is not repeated during a honing cycle. The progressive meshing of the gears 16 and 17 eliminates cyclic error. At the termination of a honing cycle, the bore center is located at the average center of the gear pitch circle.

The air jet automatic sizing units employed permits holding diametric tolerances of 0.0003 inch, generating roundness and straightness within 0.0002 inch, and producing 15-microinch surface finishes. In one gear honing operation, it was found that from 0.0001 to 0.0035 inches of stock was removed from the workpiece center bore, and 0.002 inches from each of the end faces. The complete cycle time averaged 20 seconds per workpiece, and the aforedescribed automatic loading and unloading apparatus took only 3 seconds to eject a completed or finished gear workpiece 15 and re-load the work station with a new gear workpiece 15.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. The method of generating a final surface finish on the tooth flanks of the gear teeth on a gear workpiece having a center bore and simultaneously generating center bore to pitch circle concentricity and end face to center bore squareness, comprising, the simultaneous operations of:
    a. rotating the gear workpiece in a centerless manner about an axis coaxial with the center of the center bore, between a pair of machining gears to machine the tooth flanks of the gear teeth on the gear workpiece;
    b. machining at least one of the end faces of the gear workpiece perpendicular to said axis; and,
    c. machining the center bore of the gear workpiece concentric to said axis.

2. The method of simultaneously generating center bore to characteristic circle concentricity and end face to center bore squareness on a rotatable workpiece having a center bore, a pair of end faces perpendicular to said center bore, and a characteristic circle, comprising, the simultaneous operations of:
    a. rotating the rotatable workpiece in a centerless manner about an axis coaxial with the center of the center bore, between a rotating drive member and a braked member engaging the rotatable workpiece at said characteristic circle;
    b. machining at least one of the end faces of the rotatable workpiece perpendicular to said axis; and,
    c. machining the center bore of the rotatable workpiece concentric to said characteristic circle.

* * * * *